(12) United States Patent
Han

(10) Patent No.: US 9,303,733 B2
(45) Date of Patent: Apr. 5, 2016

(54) THREE VARIABLE AND FOUR VARIABLE TRANSGEAR ASSEMBLIES

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 14/668,315

(22) Filed: Mar. 25, 2015

(65) Prior Publication Data

US 2015/0204421 A1 Jul. 23, 2015

Related U.S. Application Data

(60) Continuation-in-part of application No. 14/096,171, filed on Dec. 4, 2013, now Pat. No. 9,017,208, which is a division of application No. 13/425,501, filed on Mar. 21, 2012, now Pat. No. 8,641,570, application (Continued)

(51) Int. Cl.
*F16H 29/04* (2006.01)
*F16H 15/50* (2006.01)
*F16H 3/72* (2006.01)
*H02P 9/04* (2006.01)
*H02P 9/42* (2006.01)

(52) U.S. Cl.
CPC .. *F16H 3/72* (2013.01); *H02P 9/04* (2013.01); *H02P 9/42* (2013.01); *F16H 15/50* (2013.01); *F16H 29/04* (2013.01); *Y02E 10/722* (2013.01)

(58) Field of Classification Search
CPC .................................. F16H 29/04; F16H 15/50
See application file for complete search history.

(56) References Cited

U.S. PATENT DOCUMENTS 5,062,823 A * 11/1991 Ra et al. ......................... 475/330
5,171,194 A 12/1992 Shen (Continued)

FOREIGN PATENT DOCUMENTS

WO WO2011011358 A2 1/2011

OTHER PUBLICATIONS

PCT International Search Report for International Application No. PCT/US2015/025121, dated Jul. 28, 2015.

(Continued)

*Primary Examiner* — Tisha Lewis

(57) ABSTRACT

Infinitely variable motion control (IVMC) using Transgear gear assemblies provides rotary motion control without any requirement for connecting or disconnecting gear meshes or use of a clutch. A bevel, miter, ring or spur gear Transgear gear assembly may be defined as a gear assembly having three or four of variables, input, output and control, assigned in a manner so as to provide, for example, one of accumulation of inputs and direction control. A four variable Transgear gear assembly may be one of a spur gear Transgear gear assembly having an additional ring gear surrounding a set of planetary gears or a bevel gear Transgear gear assembly having a double bevel gear, an outer bevel gear and a bevel gear meshing to the outer bevel gear sleeve surrounding an inner beveled gear and comprising three orthogonal carrier shafts. Rather than two sets of three variable Transgear gear assemblies connected in series or in parallel, a four variable Transgear gear assembly may provide, for example, a direction control function with just one gear assembly with two of the four variables assignable as control variables.

17 Claims, 22 Drawing Sheets

Related U.S. Application Data

No. 14/668,315, which is a continuation-in-part of application No. 14/225,658, filed on Mar. 26, 2014, now Pat. No. 9,169,772, said application No. 13/425,501 is a continuation-in-part of application No. 13/384,621, filed as application No. PCT/US2010/042519 on Jul. 20, 2010, now Pat. No. 8,388,481.

(60) Provisional application No. 61/466,056, filed on Mar. 22, 2011, provisional application No. 61/805,584, filed on Mar. 27, 2013, provisional application No. 61/825,560, filed on May 21, 2013, provisional application No. 61/226,943, filed on Jul. 20, 2009.

(56) References Cited

U.S. PATENT DOCUMENTS

| | | | |
|---|---|---|---|
| 5,326,334 A * | 7/1994 | Ra et al. | 475/330 |
| 5,423,726 A | 6/1995 | Kota et al. | |
| 5,525,116 A * | 6/1996 | Ra et al. | 475/275 |
| 6,068,570 A | 5/2000 | Han | |
| 6,537,168 B1 | 3/2003 | Han | |
| 7,462,124 B2 | 12/2008 | Han | |
| 7,731,616 B2 | 6/2010 | Han | |
| 7,731,619 B2 | 6/2010 | Han | |
| 7,867,122 B2 * | 1/2011 | Jones | 475/2 |
| 8,388,481 B2 | 3/2013 | Han | |
| 8,617,020 B2 * | 12/2013 | Winter | 475/217 |
| 8,641,570 B2 | 2/2014 | Han | |
| 8,986,149 B2 | 3/2015 | Han | |
| 2002/0068658 A1 | 6/2002 | Suzuki et al. | |
| 2011/0269592 A1 | 11/2011 | Klomp | |
| 2012/0243991 A1 | 9/2012 | Han | |
| 2014/0094338 A1 | 4/2014 | Han | |

OTHER PUBLICATIONS

PCT Written Opinion of the International Searching Authority for International Application No. PCT/US2015/025121, dated Jul. 28, 2015.

* cited by examiner

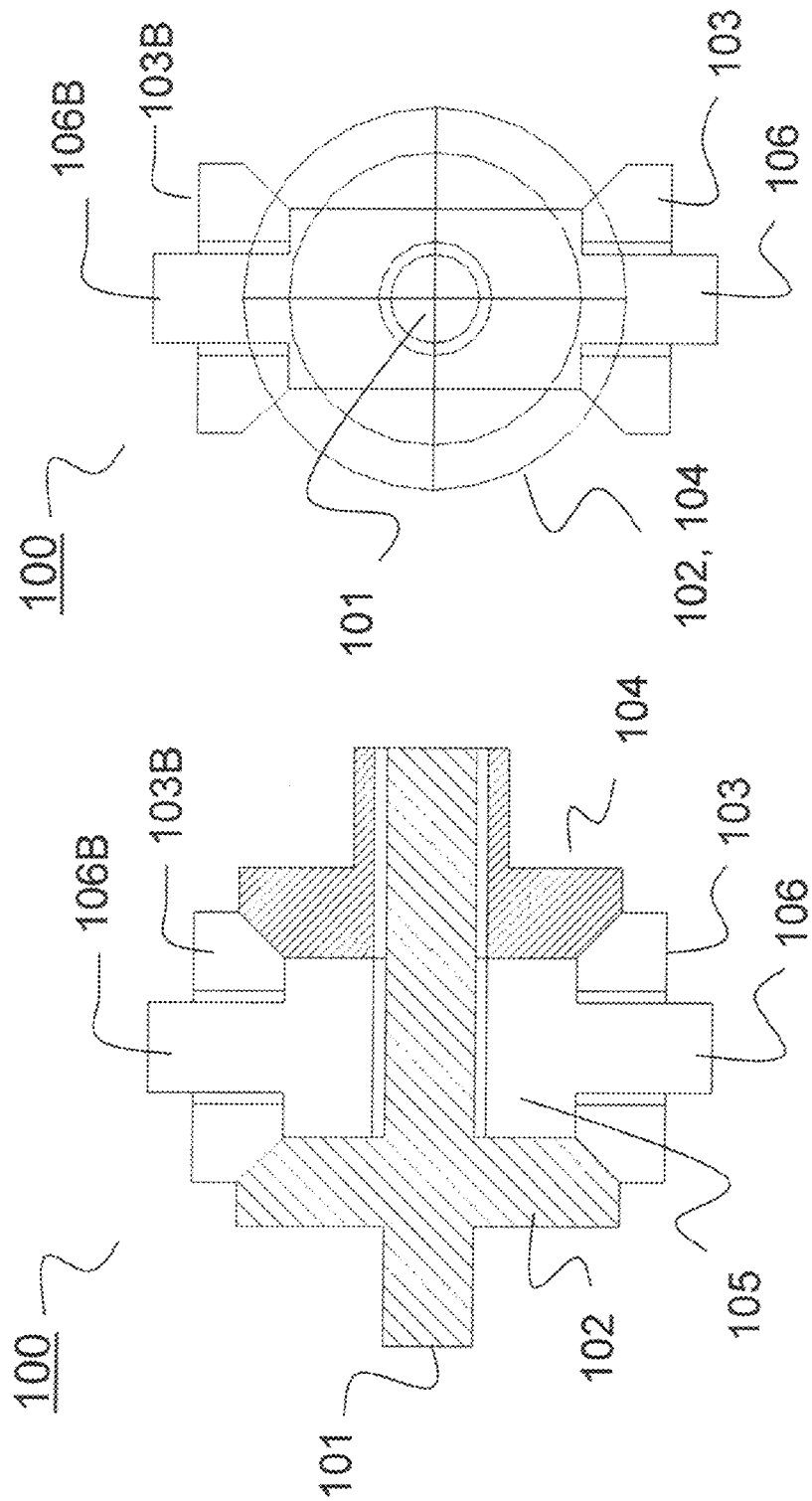

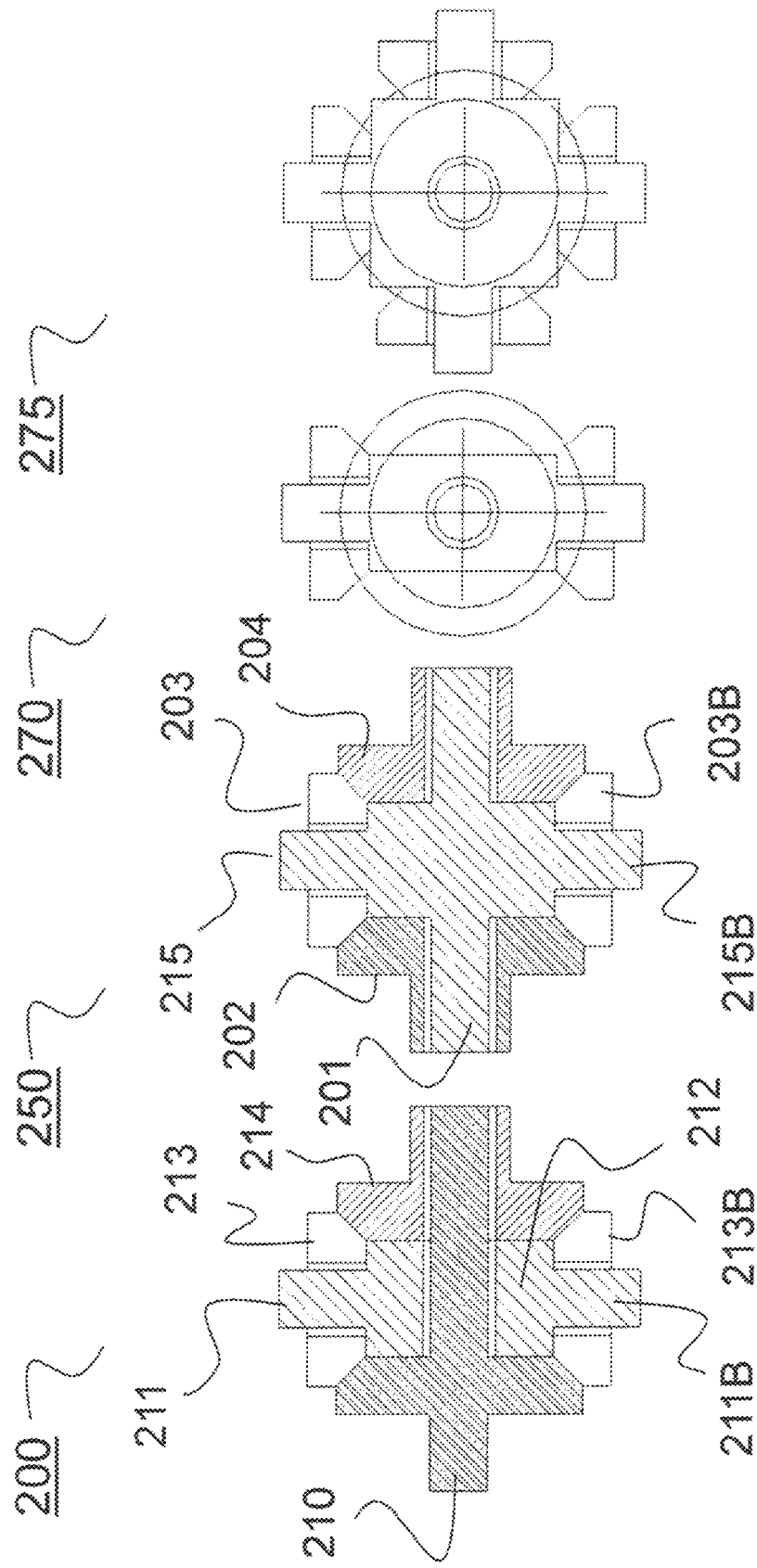

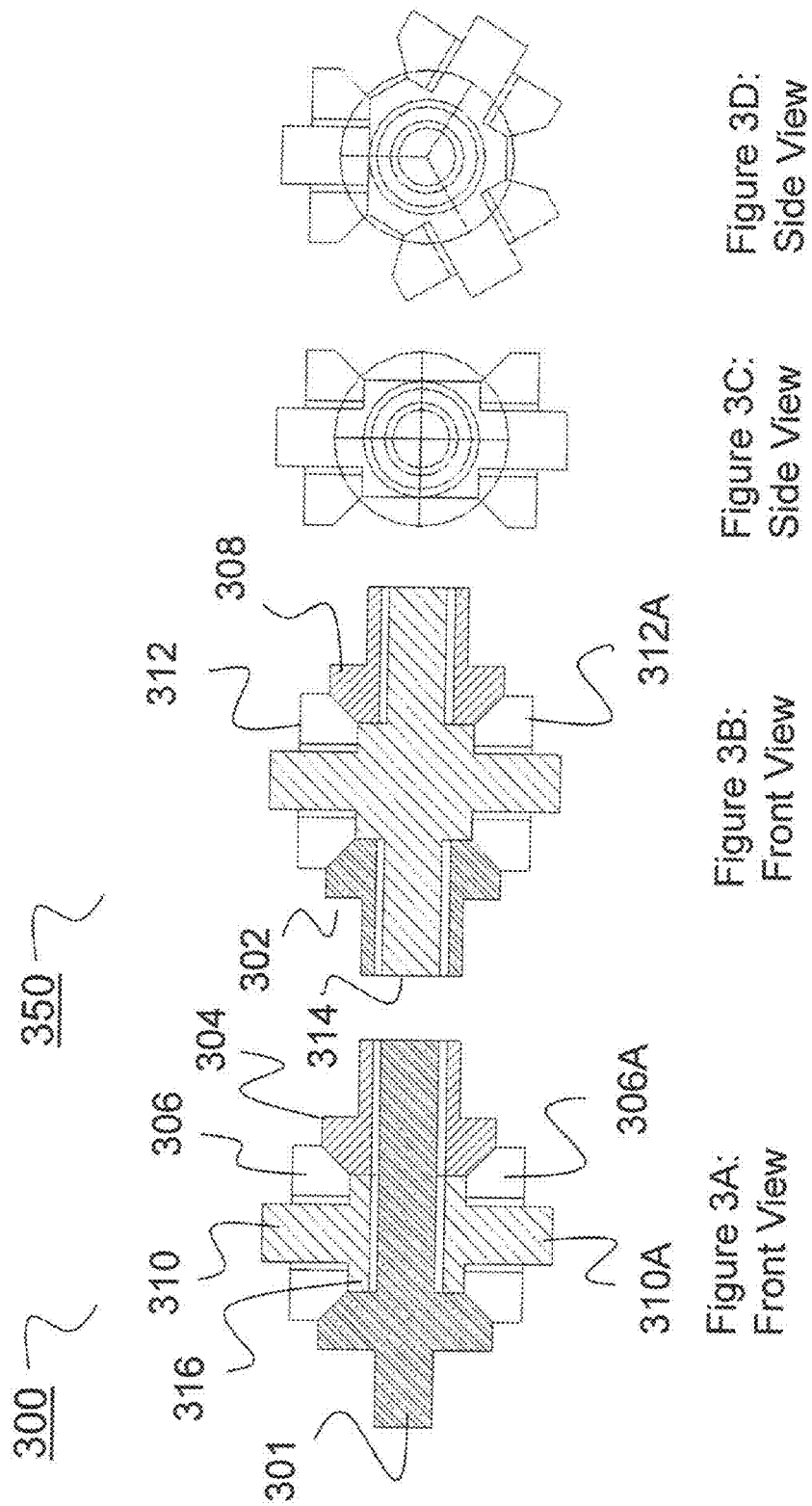

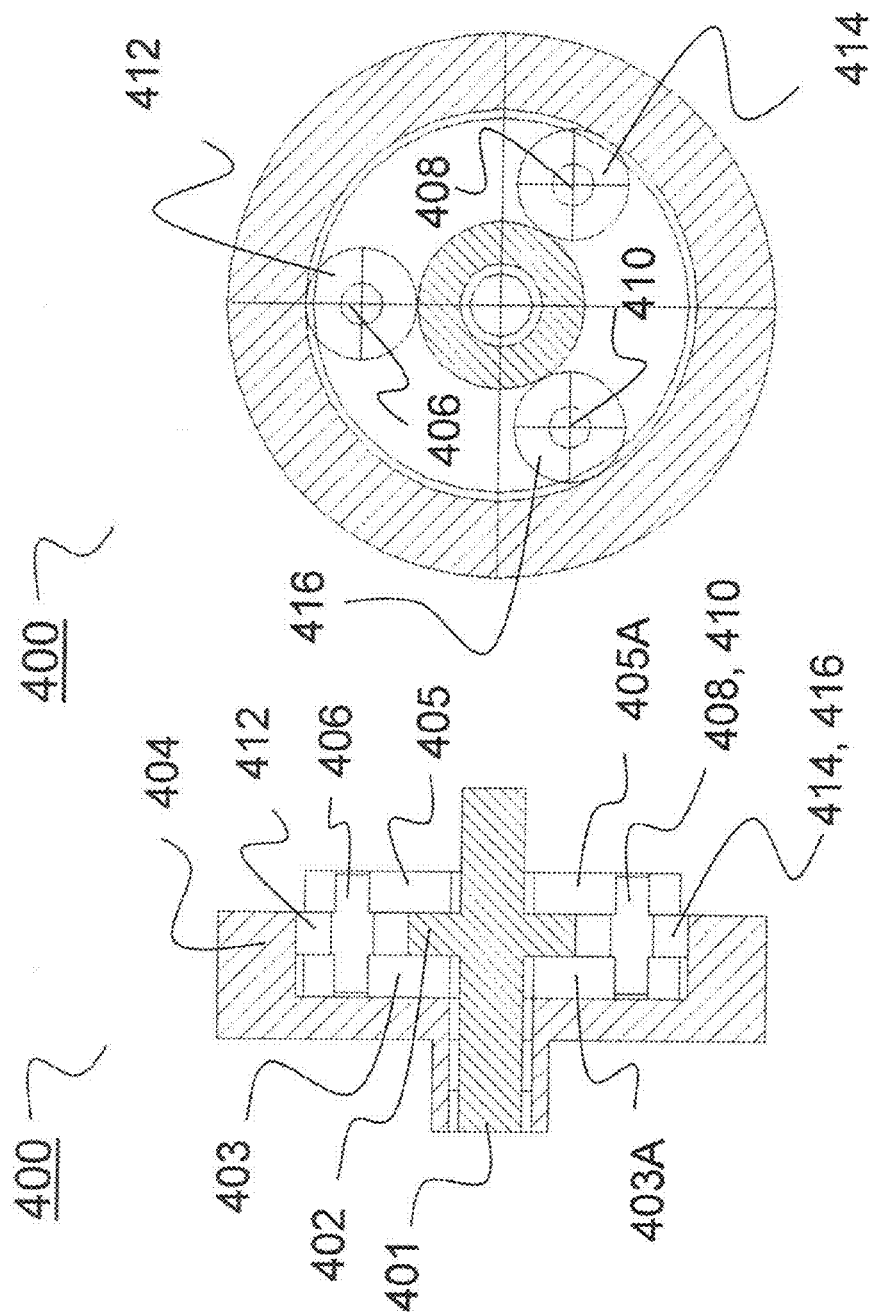

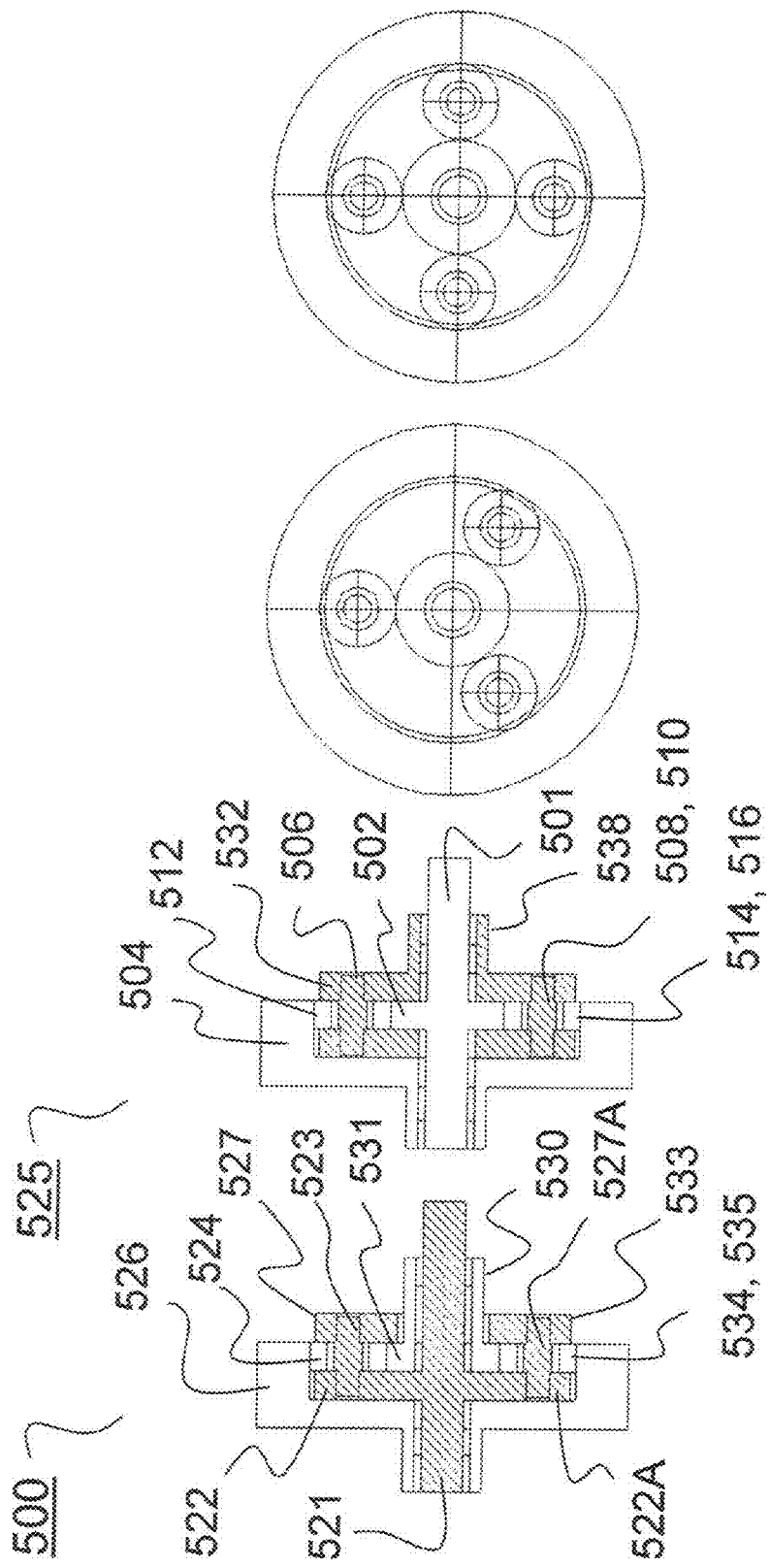

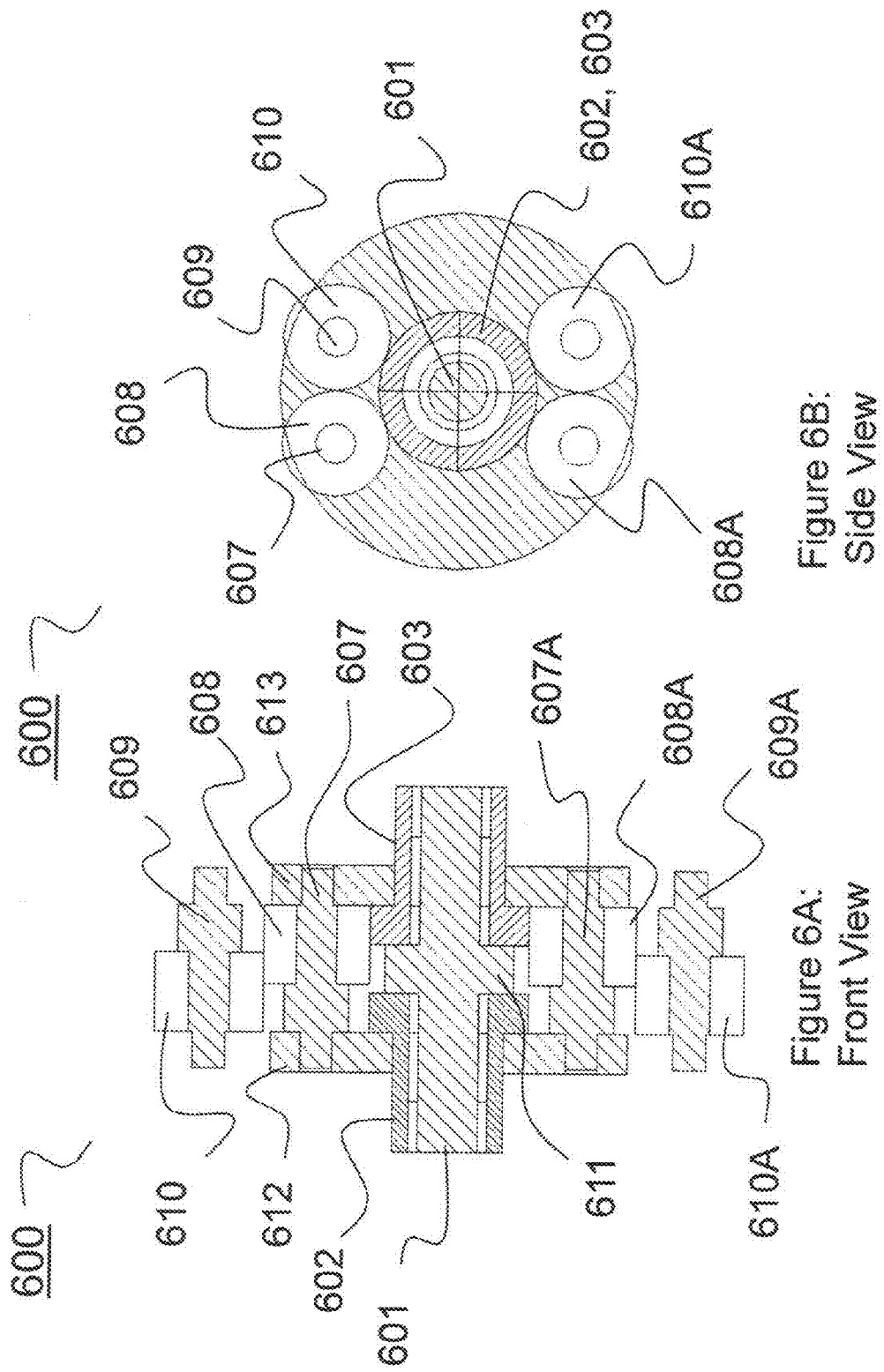

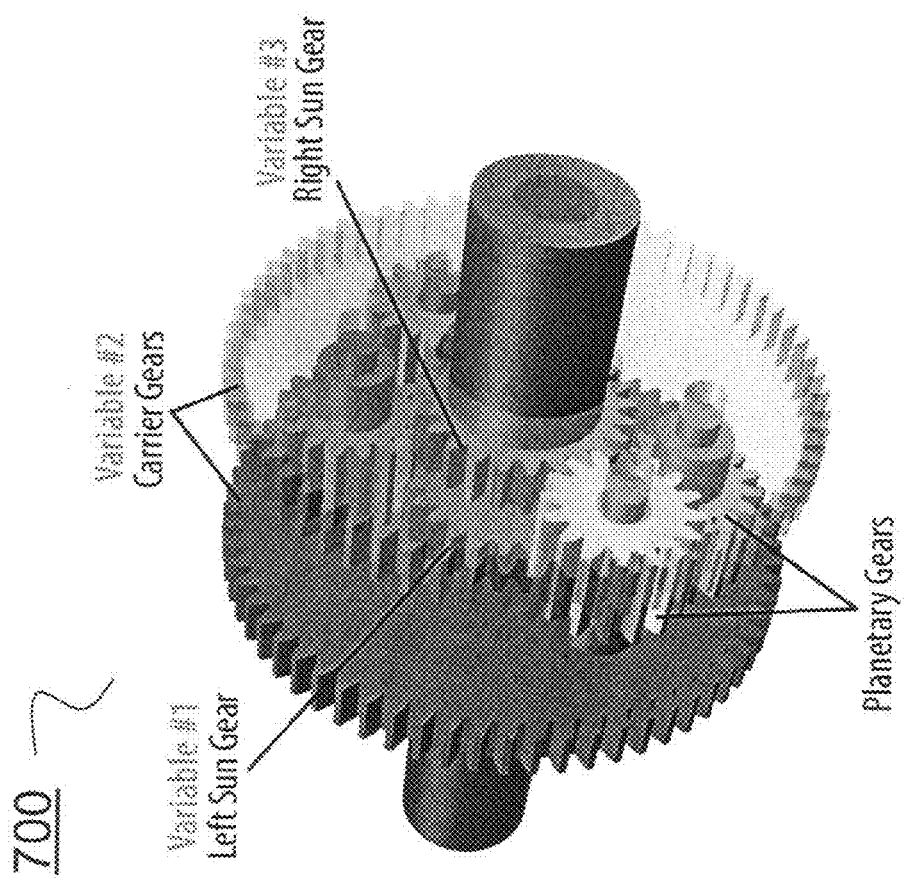

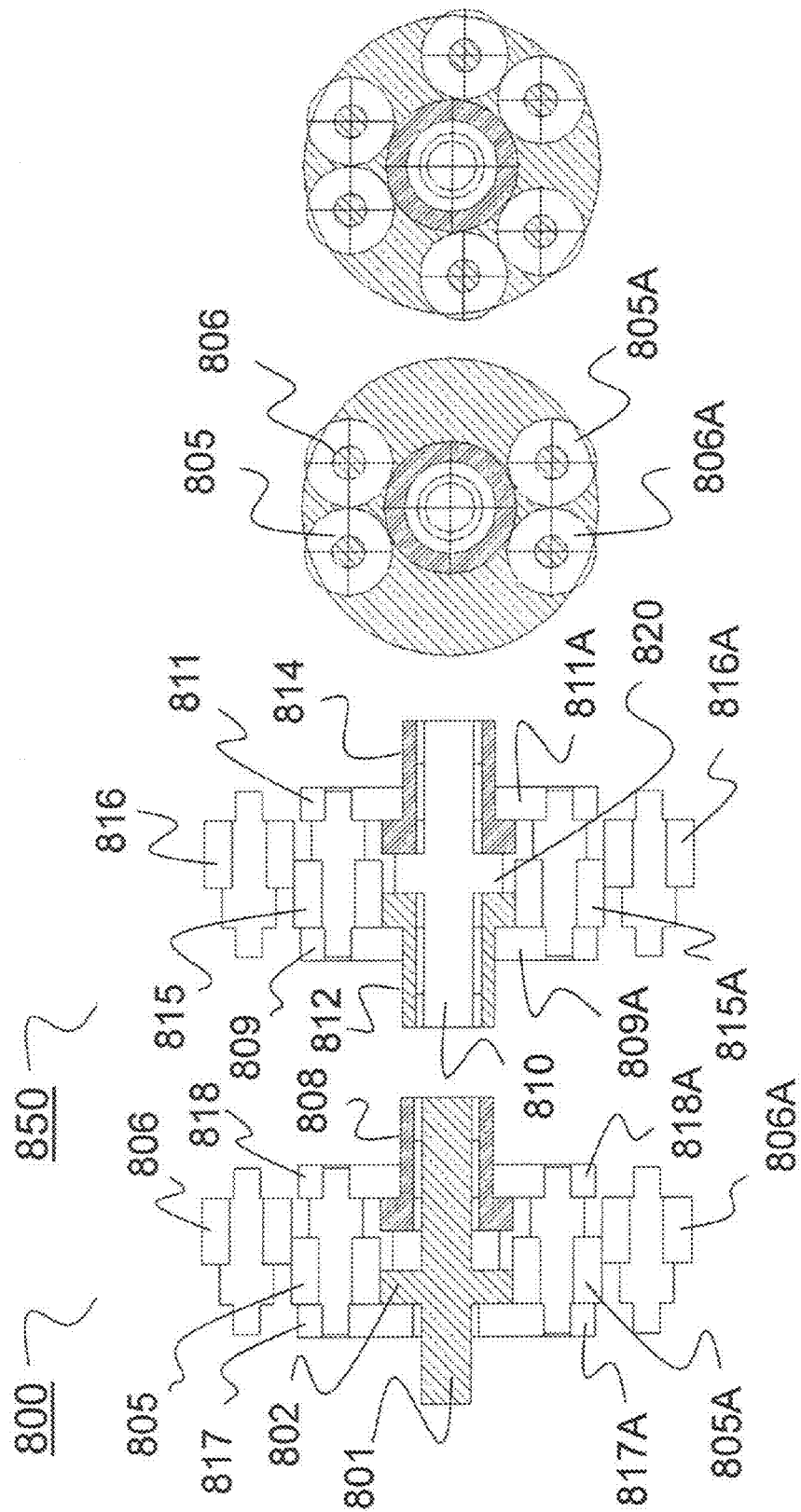

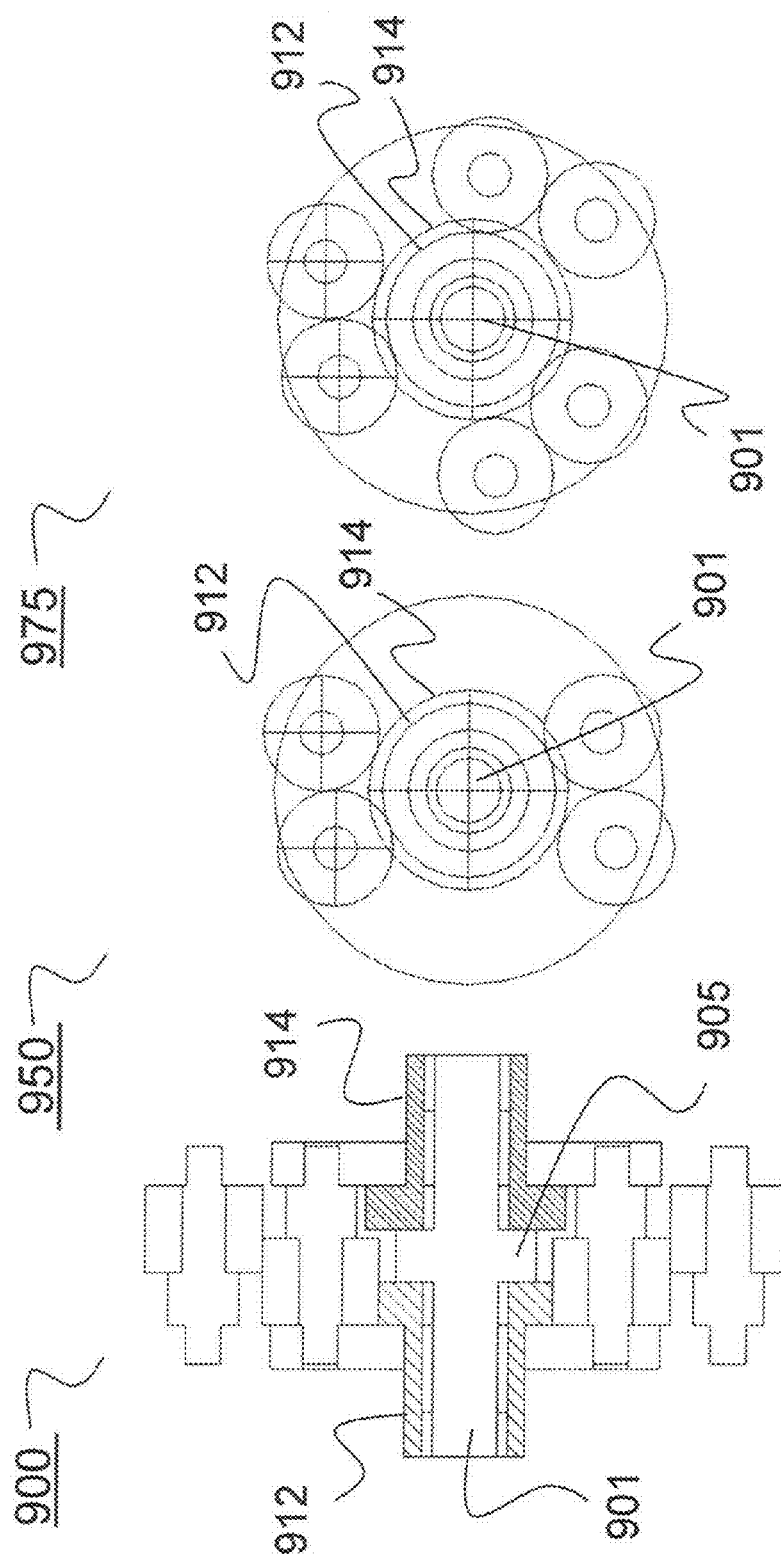

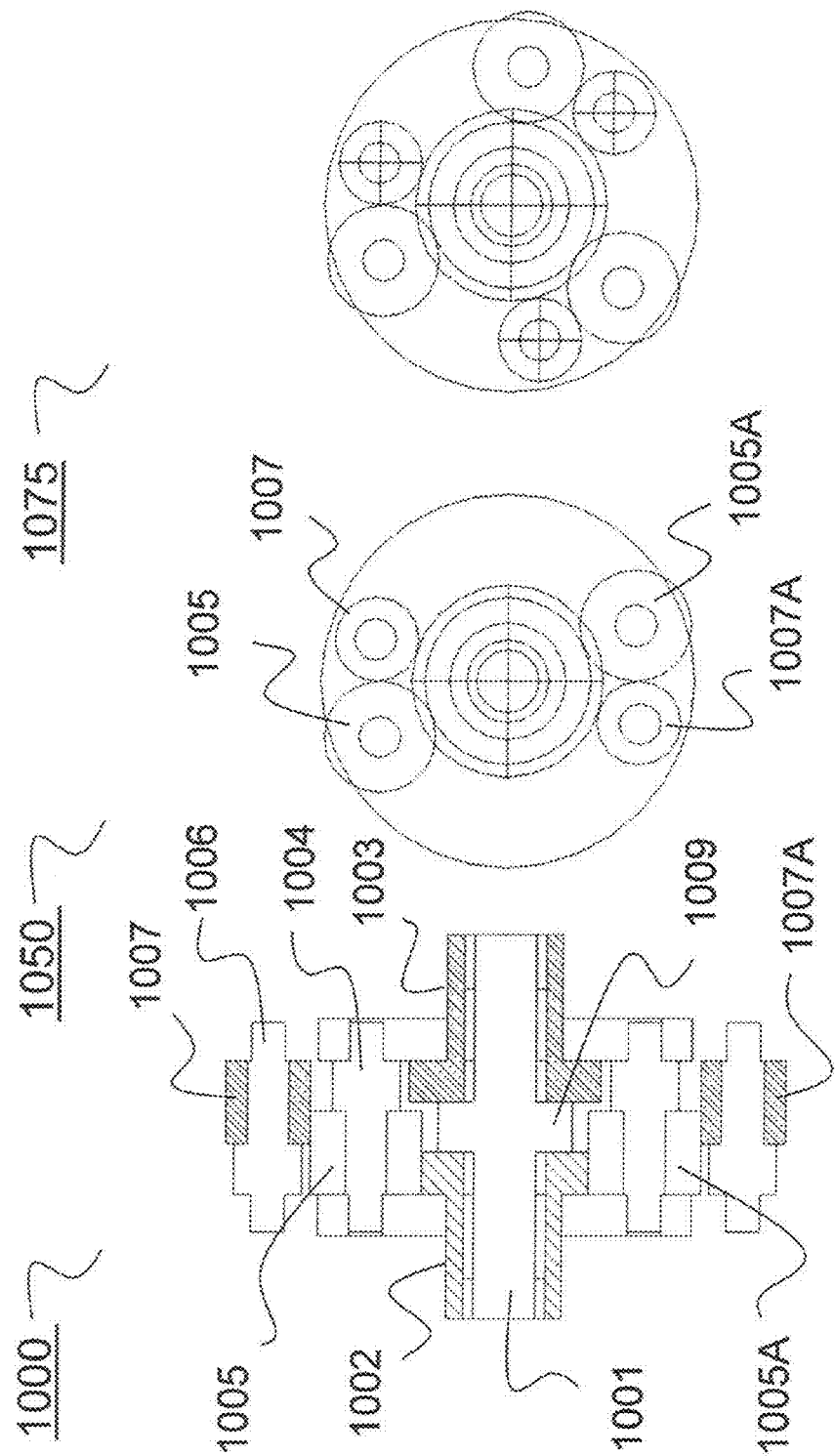

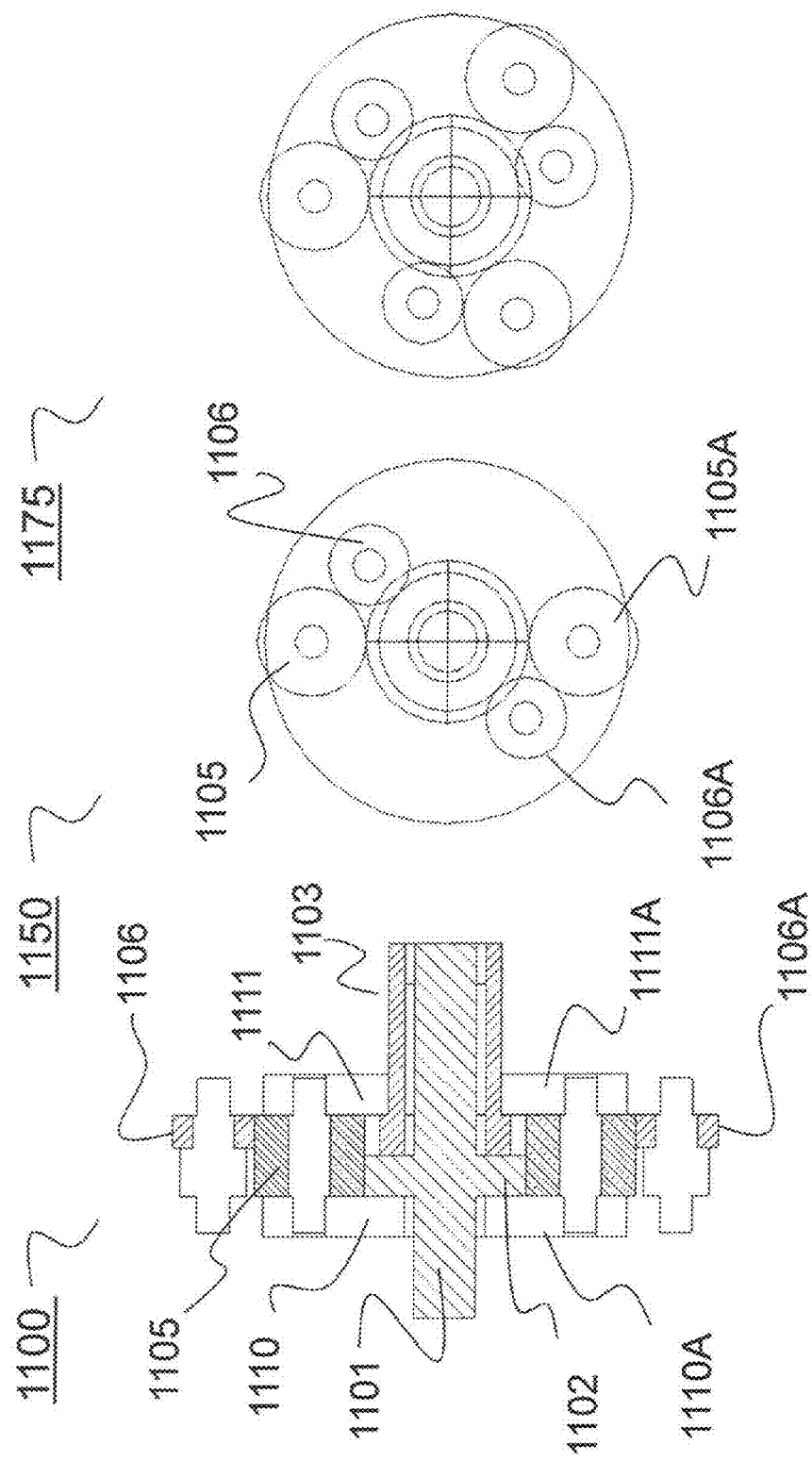

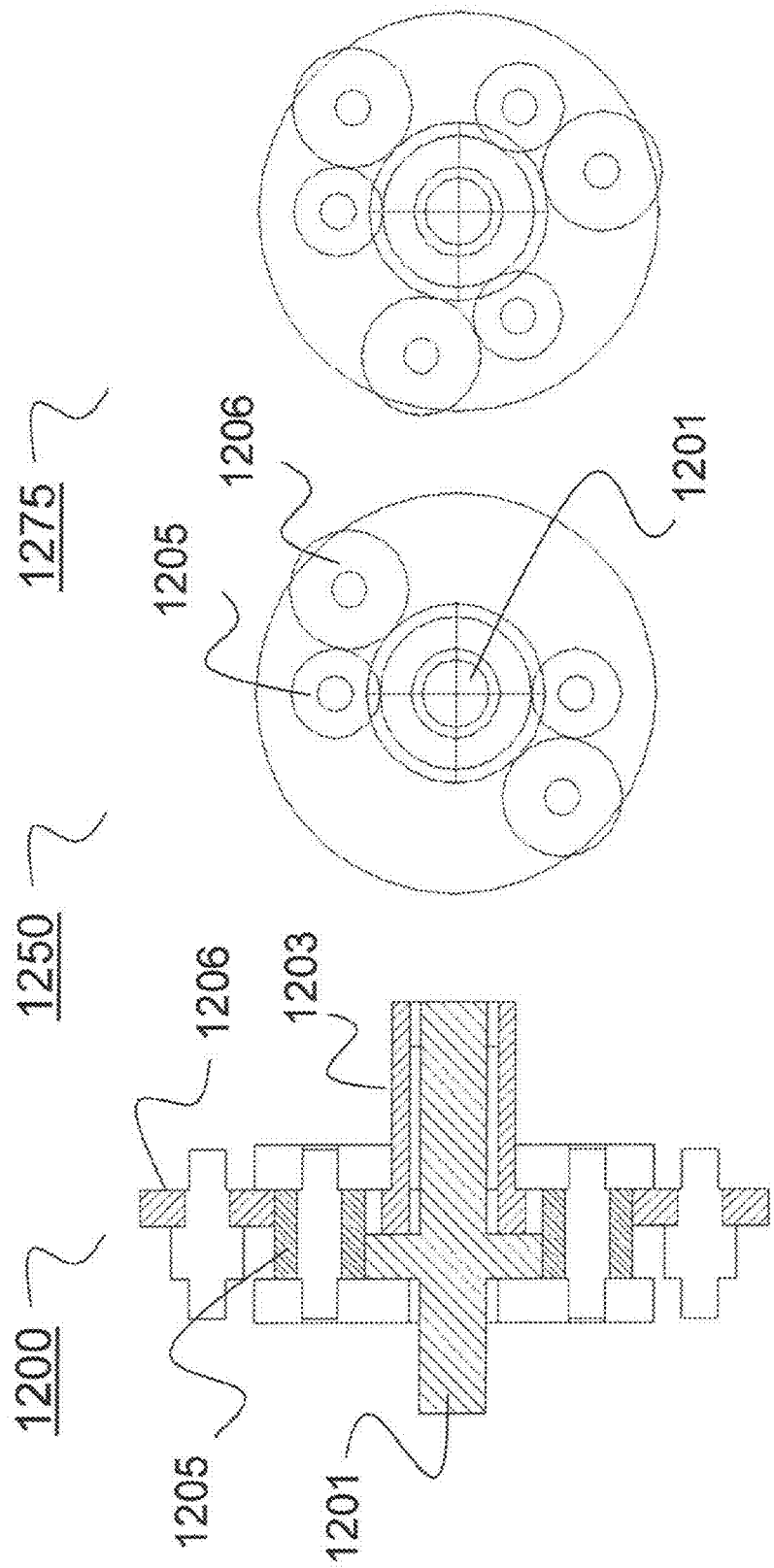

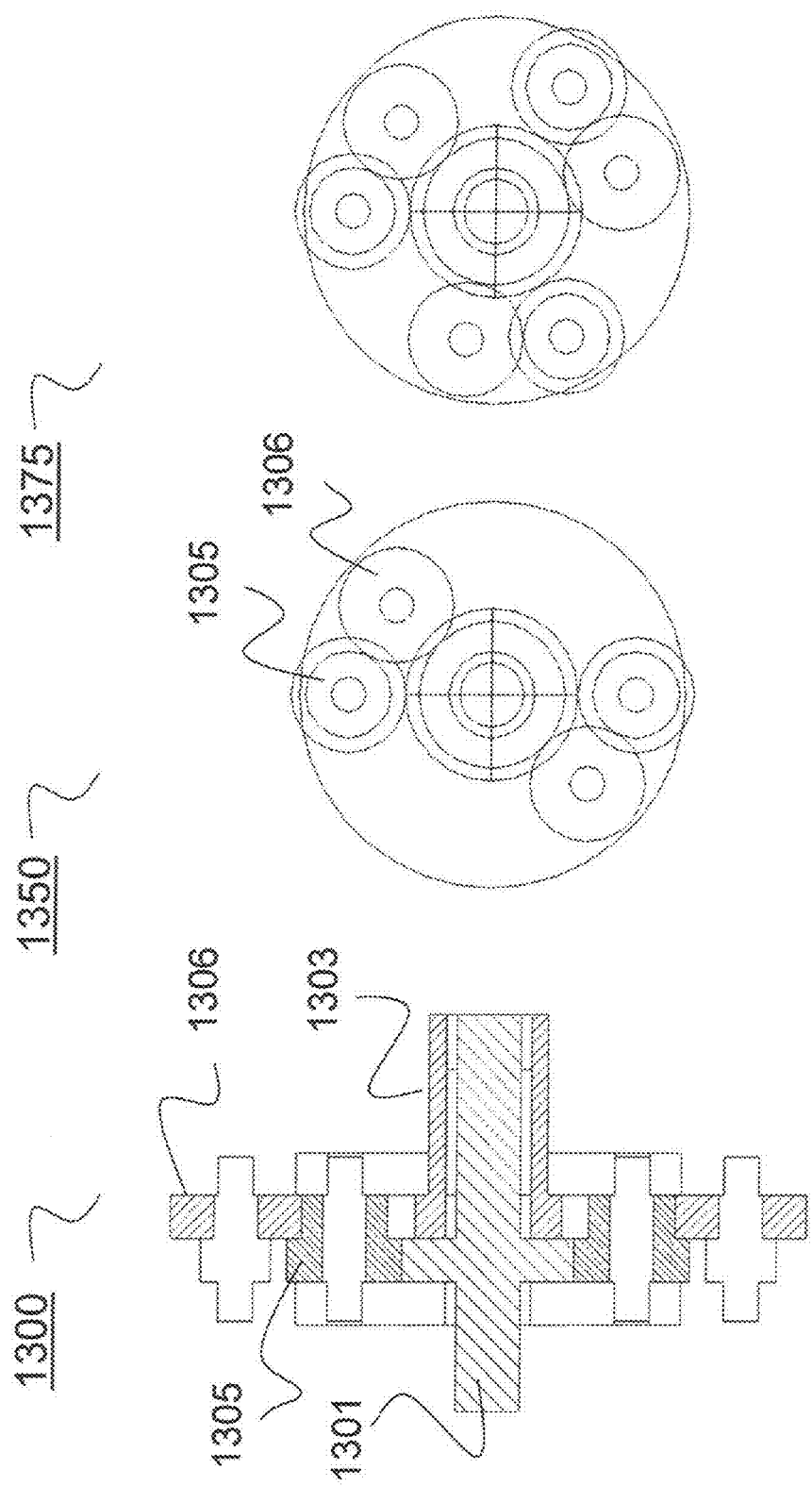

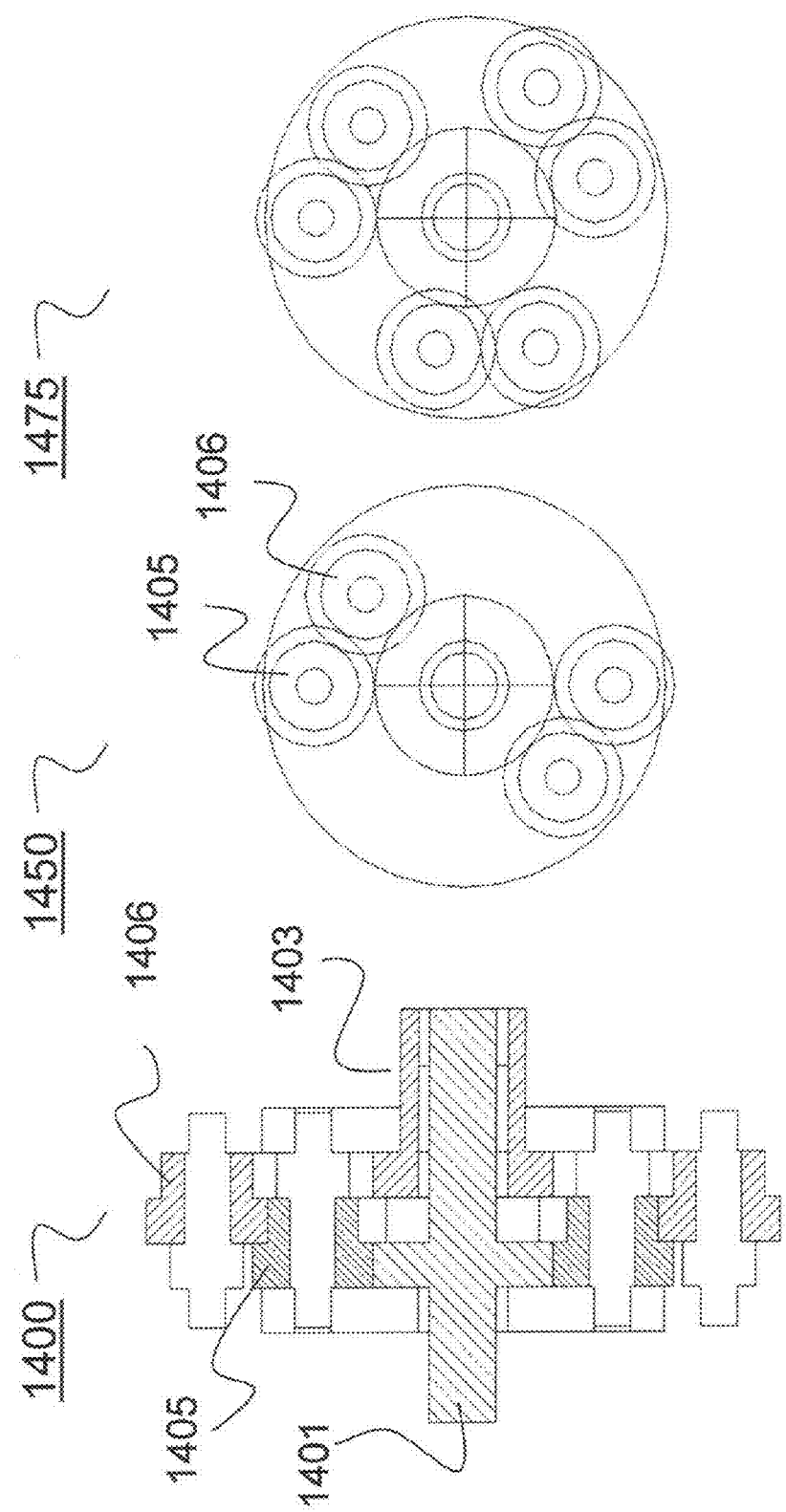

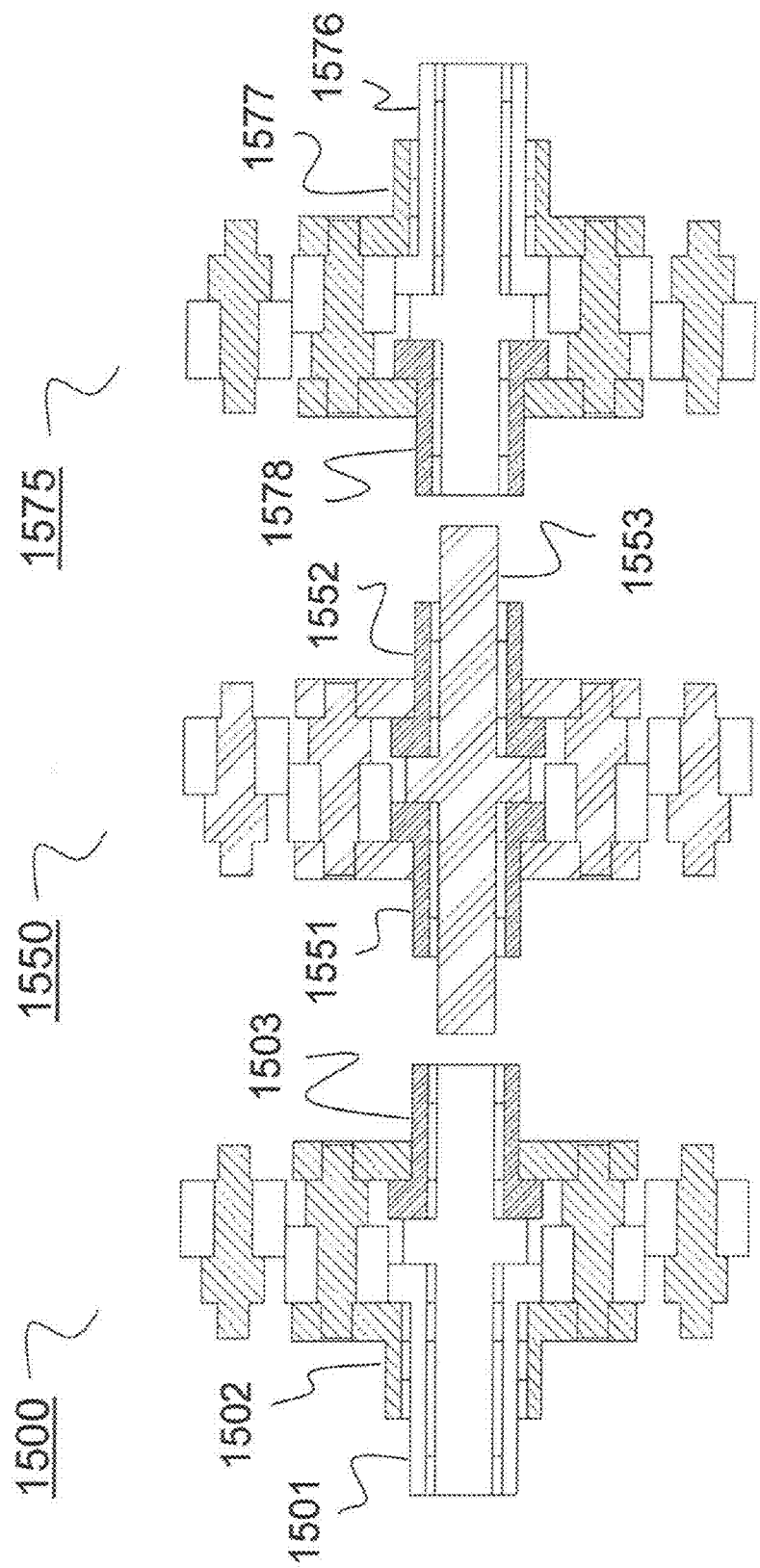

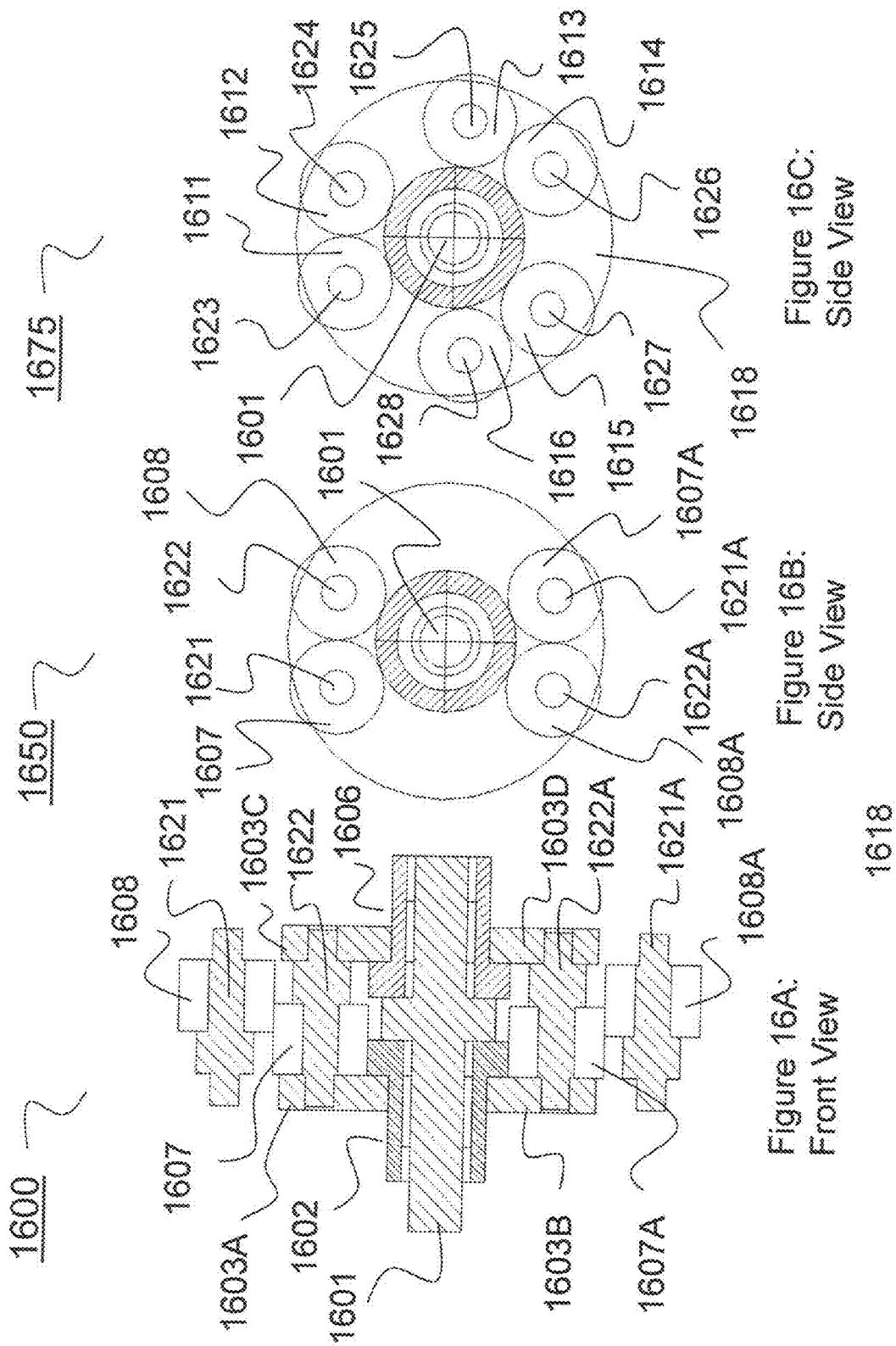

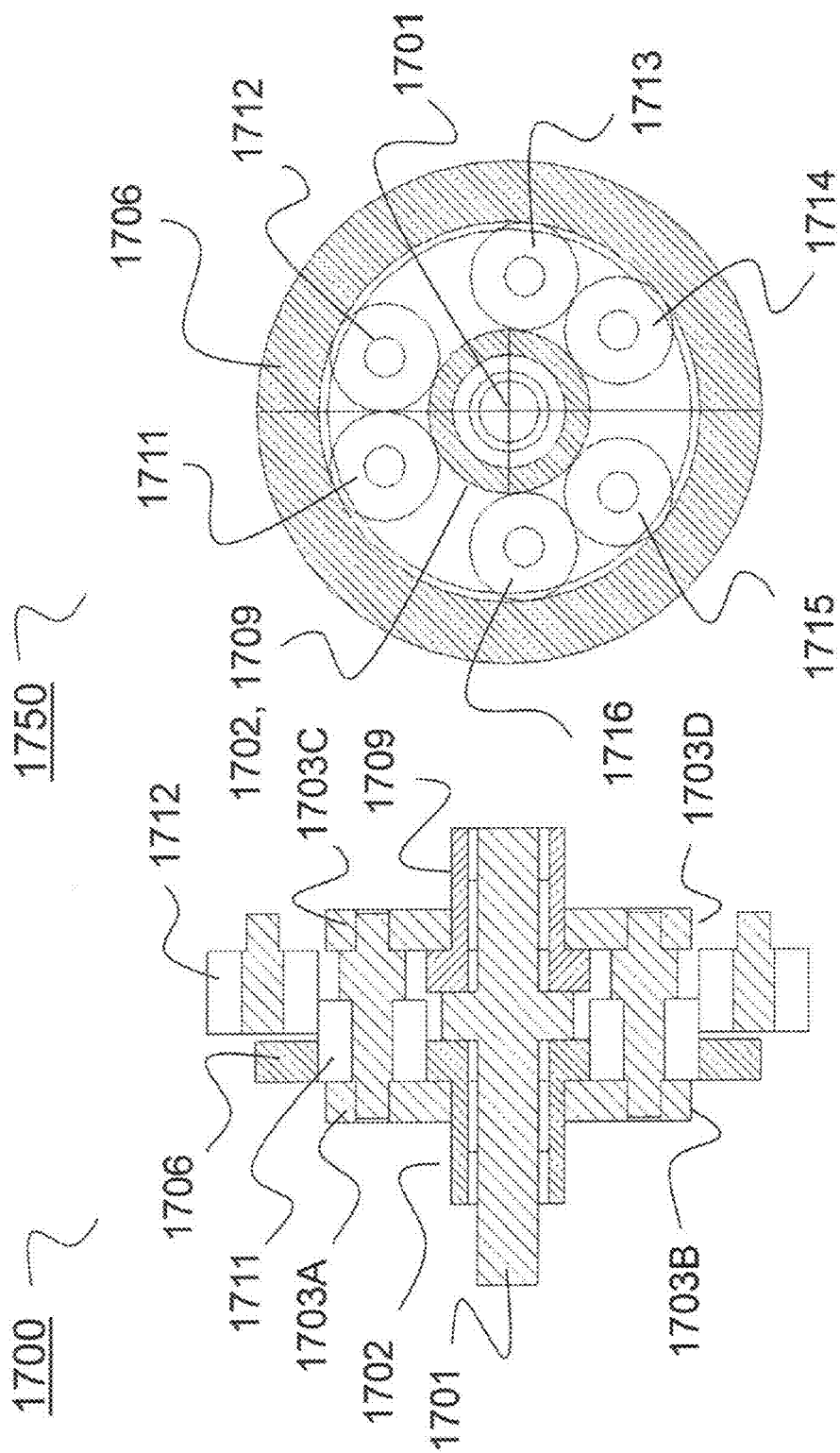

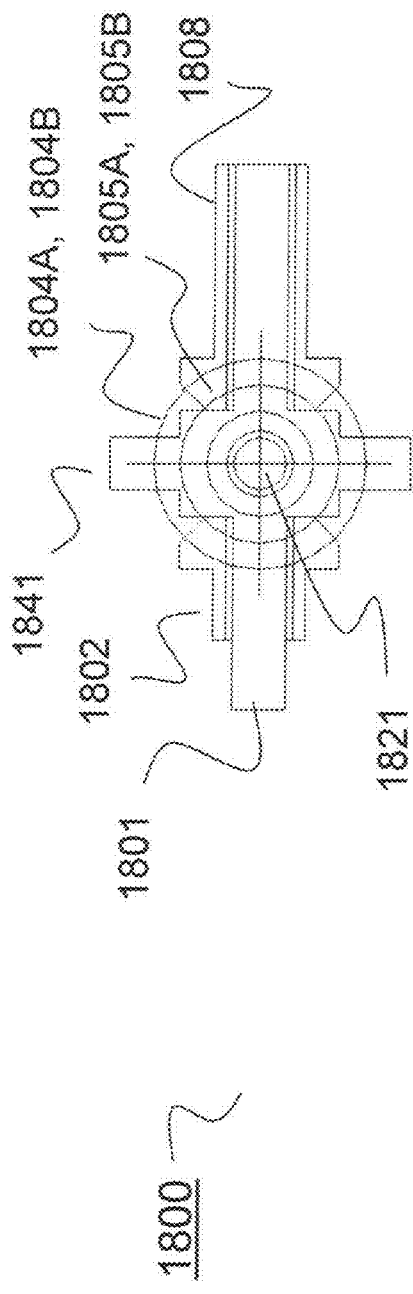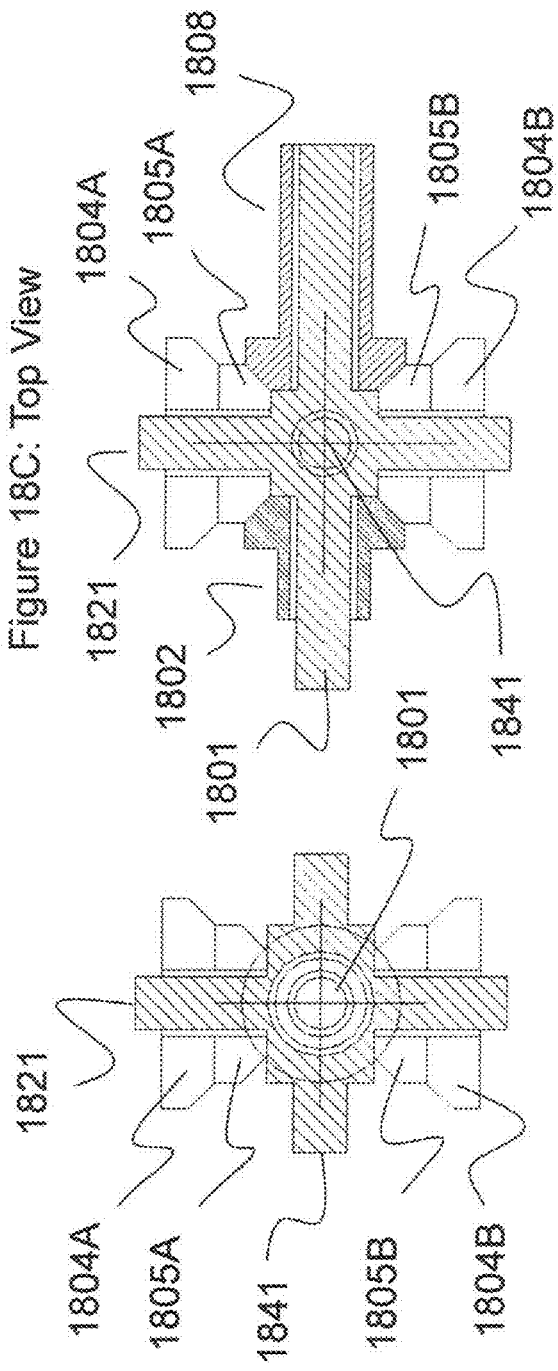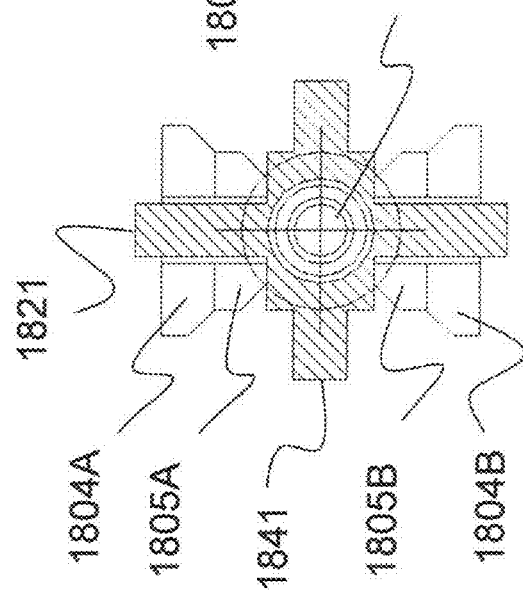

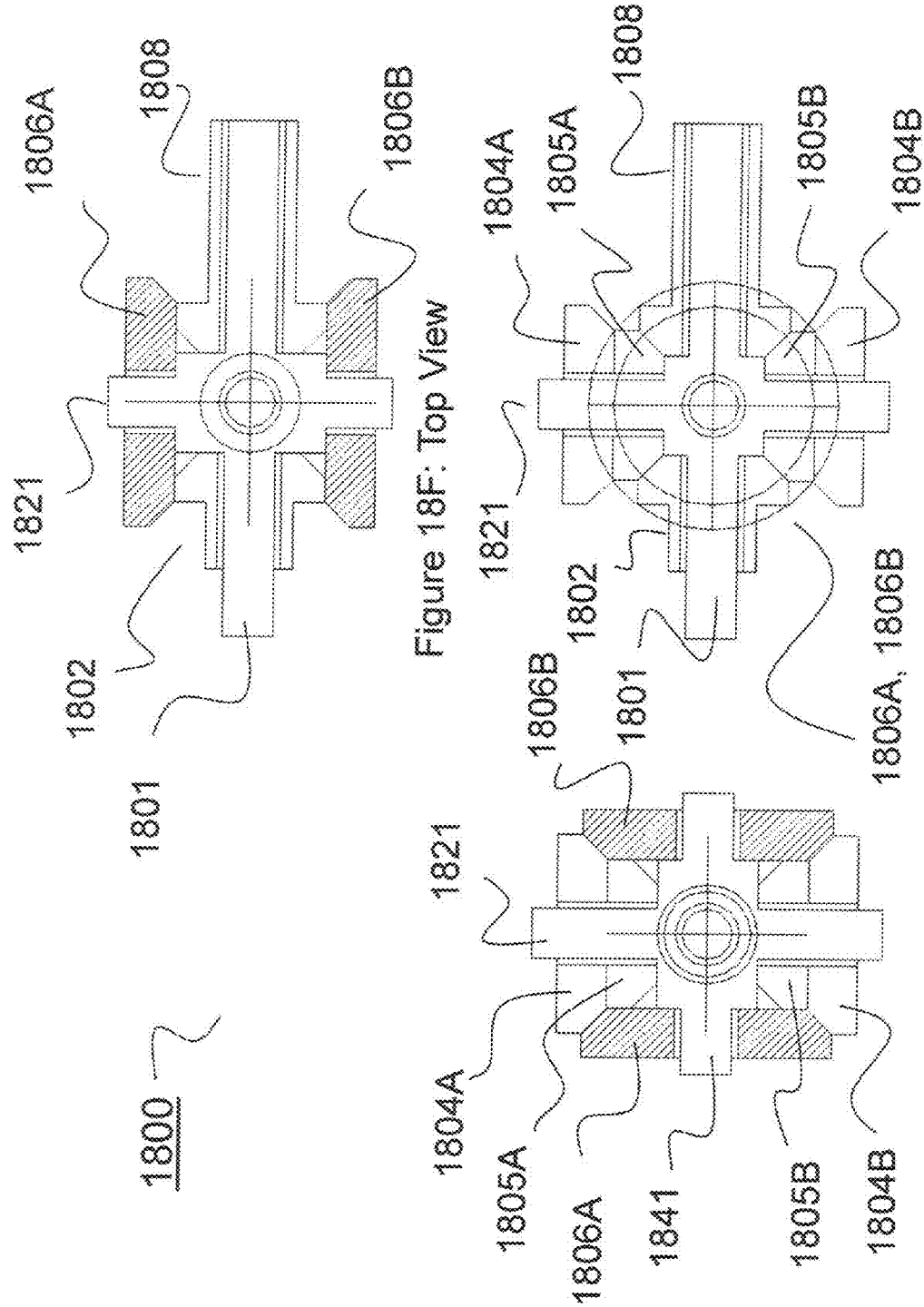

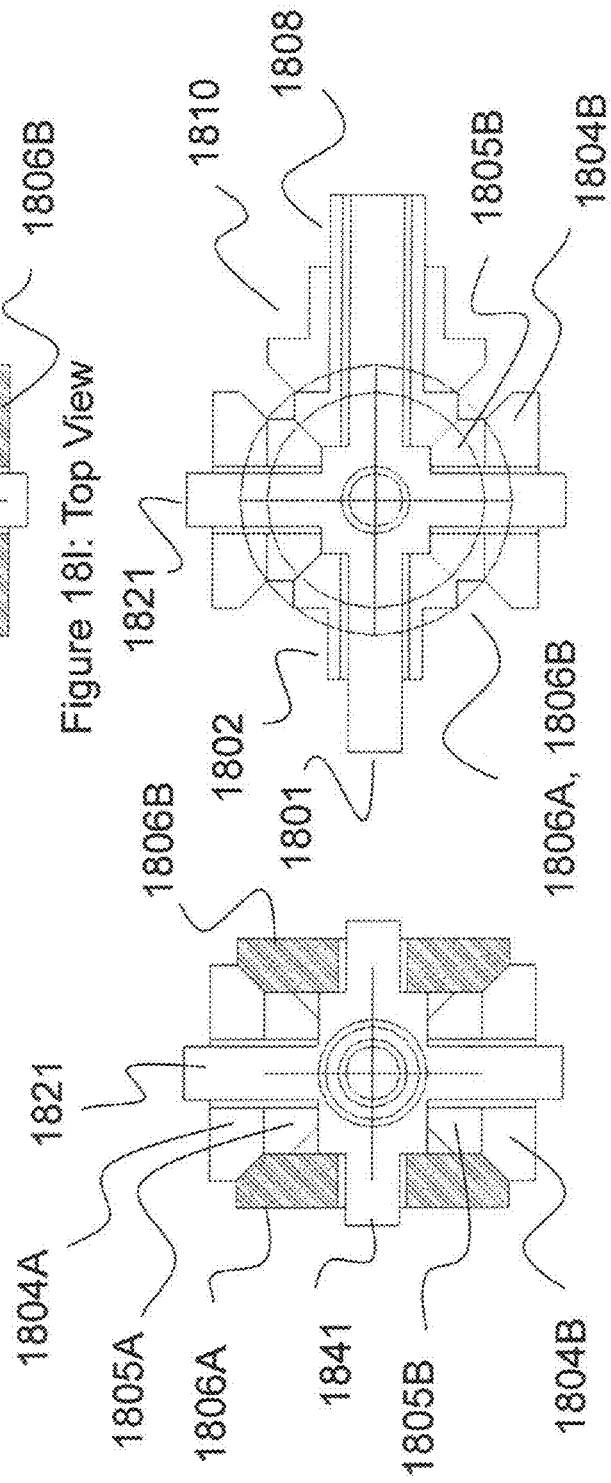
Figure 18G: Front View    Figure 18H: Side View    Figure 18I: Top View

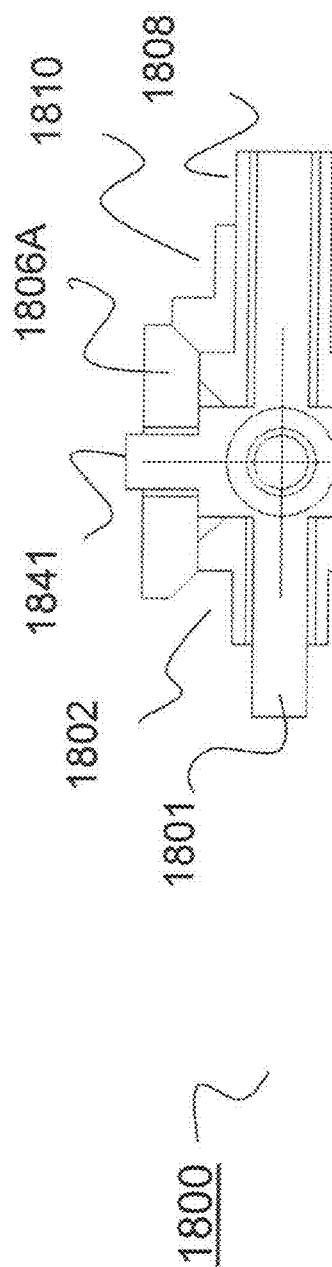
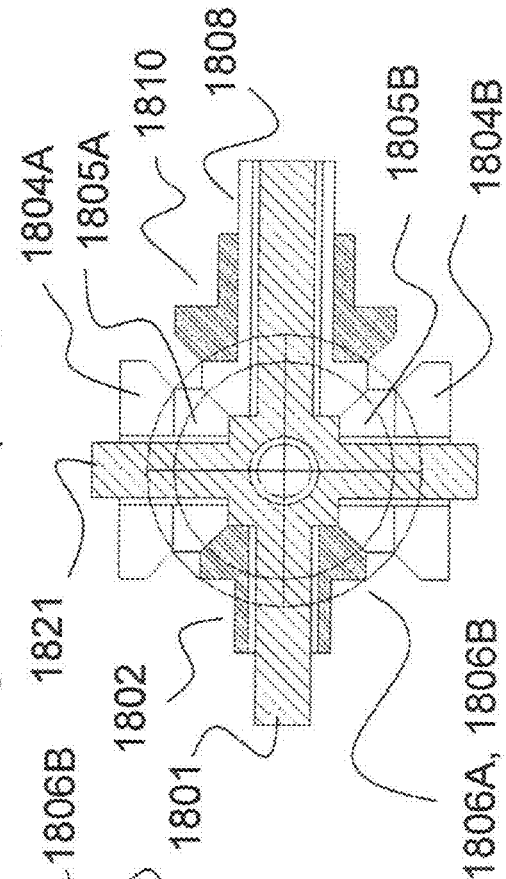
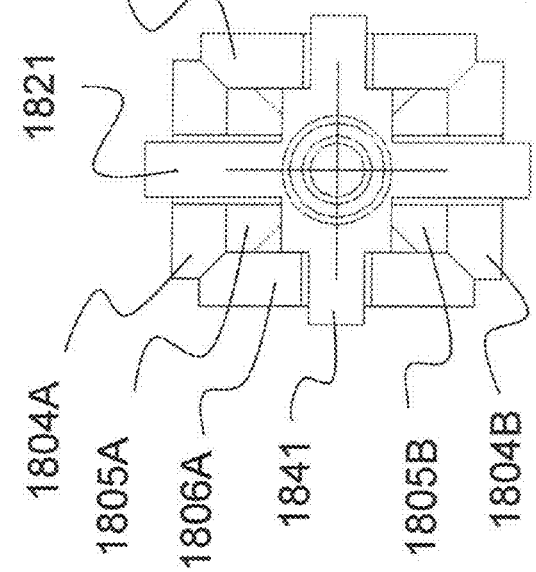
Figure 18J: Front View
Figure 18K: Side View
Figure 18L: Top View

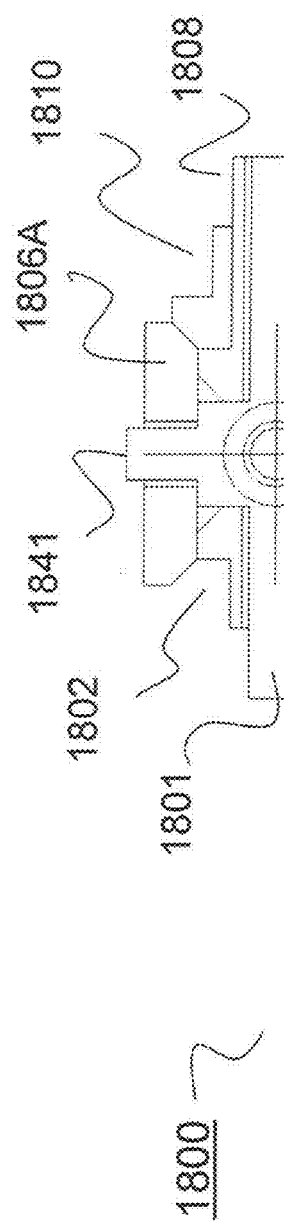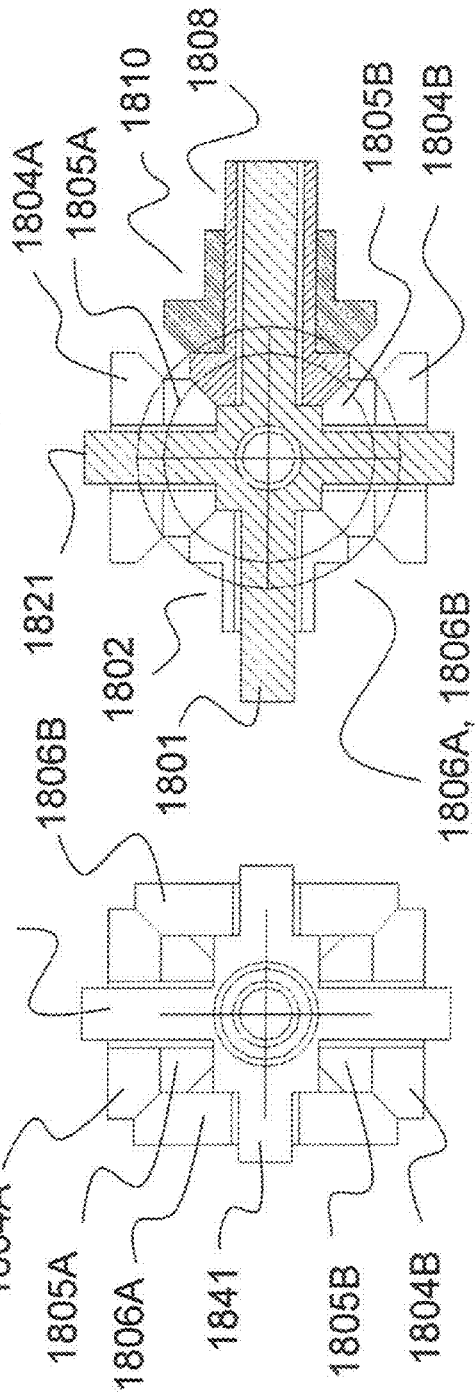

THREE VARIABLE AND FOUR VARIABLE TRANSGEAR ASSEMBLIES

This application is a continuation-in-part of U.S. patent application Ser. No. 14/096,171 filed Dec. 4, 2014, now allowed, entitled "Infinitely Variable Motion Control (IVMC) for Generators, Transmissions and Pumps/Compressors," which is a divisional of U.S. patent application Ser. No. 13/425,501 filed Mar. 21, 2013 (now U.S. Pat. No. 8,641,570 issued Feb. 4, 2014) which claims the benefit of priority to U.S. Patent Application Ser. No. 61/466,056 filed Mar. 22, 2011, and is also a continuation-in-part of U.S. patent application Ser. No. 14/225,658 filed Mar. 26, 2014, entitled "One-Stroke Internal Combustion Engine," which claims the benefit of priority to U.S. Provisional Patent Application Ser. Nos. 61/805,584 filed Mar. 27, 2013 entitled "Reciprocating Rotary or Linear Engines with Dedicated Chambers for Intake and Exhaust" and 61/825,560 filed May 21, 2013 entitled "Reciprocating Rotary or Straight/Linear Engines with Dedicated Chambers for Intake, Compression, Ignition/Combustion, and Exhaust" by Kyung Soo Han, the contents of each of which are incorporated by reference as to their entire contents and U.S. patent application Ser. No. 13/425,501 is a continuation-in-part of U.S. patent application Ser. No. 13/384,621, filed Jan. 18, 2012, (now U.S. Pat. No. 8,388,481 issued Mar. 5, 2013) being a national stage entry application of PCT US 10/42519 having an international filing date of Jul. 20, 2010 which claims the benefit of priority to U.S. provisional patent application 61/226,943, filed Jul. 20, 2009, all applications being of Kyung Soo Han and incorporated, by reference as to their entire contents.

TECHNICAL FIELD

The technical field of the invention relates to applications of Transgear™ gear assemblies having three variables, such as input, output and control, and four variables, such as input and output and two controls, and applications thereof, for example, for direction or speed control or other control of a vehicle, pump, generator, engine, wind or river turbine or other motive device including, for example, applications for accumulating two or more inputs to an output under control or two or more controls to an input for providing a single output.

BACKGROUND

It is generally known in the art to provide devices such as generators, transmissions, engines, pumps or compressors, turbines and vehicles with variable speeds and with forward and reverse direction control. In particular, transmissions are known with many speeds and gears whereby a shifting of gears and speeds typically involves the use of a clutch device so that a range of speed may be changed, for example, through a plurality of gears to reach a maximum number of revolutions per minute of an output shaft in each of the plurality of gears while an input shaft operates within the angular velocity range of, for example, a driving motor. Forward and reverse direction control is another application of a first and second Transgear gear assembly as well as zero-turning radius assemblies for controlling two sets of two wheels to, for example, drive without any turning radius.

Applicant has been developing a concept referred to herein as infinitely variable motion control (IVMC) whereby, for example, three variables, such as a mechanical input, a control, and an output, provide infinitely variable control of parameters which may be speed, direction, direction of rotation, control of a water turbine hatch, turning radius and the like as well as the accumulation of inputs.

Introduction to Infinitely Variable Motion Control (IVMC)

Differential Dynamics Corporation (DDMotion) has developed several different types of motion control technology to convert a given input to a controlled output. Each technology will be explained briefly first as part of the BACKGROUND. In the SUMMARY, the latest developments in infinitely variable motion controls will be described and, then, in the DETAILED DESCRIPTION of the drawings, the latest developments will be further described to three and four variable Transgear gear assemblies along with applications of the technology to some major applications such as direction control and speed control for vehicles and other devices requiring control. Most of the concepts disclosed herein are based on the Kyung Soo Han's previous developmental work as exemplified by the patents and publications discussed briefly below.

U.S. Pat. No. 6,068,570 discusses speed control with planetary gears, speed control with spur gears, worm and worm gear control and compensated variable speed control. U.S. Pat. No. 6,537,168 discusses direction control with bevel gears and direction control with spur gears. U.S. Pat. No. 7,731,616 discusses a variable pitch cam, U.S. Pat. No. 7,462,124 discusses three variable control where the variable control comprises an input, an output, and a control. U.S. Pat. No. 7,731,619 discusses three variable control with bevel gears and three variable control with spur gears. WO2011011358A2 is a published international application of PCT U.S. 10/42519 filed Jul. 20, 2010 and claiming priority to U.S. provisional patent application 61/226,943 filed Jul. 20, 2009, which describes a speed converter with cam driven control and a variable torque generator producing a constant frequency and voltage output from a variable input. This PCT application has been filed in the United States as U.S. patent application Ser. No. 13/384,621, filed Jan. 18, 2012, now U.S. Pat. No. 8,388,481 issued Mar. 5, 2013, entitled "System and Method for Providing a Constant Output from a Variable Flow Input". Since priority is claimed to this '621 national stage entry patent application, its teachings are not to be considered prior art to the present IVMC apparatus. Applications of this speed converter/variable torque generator technology include and are not limited to applications in the field of clean energy generation such as wind and water driven electrical energy generators. This application also claims priority to recently issued U.S. Pat. No. 8,641,570 issued Feb. 4, 2014, entitled "Infinitely Variable Motion Control (IVMC) for Generators, Transmissions and Pumps/Compressors," which utilizes three variable control of input, output and control to different components of a Transgear gear assembly. Referring, for example, to FIG. 22, entitled Input Compensated IVMC, a sleeve may be the input and a shall may be the output and include an input compensating motor for controlling the output with respect to the input. U.S. Pat. No. 8,986,149 issued Mar. 24, 2015, describes both speed control and direction control in some detail utilizing, for example, first and second Transgear gear assemblies. All of the above-identified patents and published applications are incorporated by reference herein as to their entire contents.

Ra et al., a Stepless Automatic Variable Transmission, U.S. Pat. No. 5,525,116 issued Jun. 11, 1996, describes a stepless automatic variable transmission with gears in a state of constant meshing and which is operational without the need for disengaging or changing the gears such that the rotational output power can be varied to effect a neutral, low speed, medium speed, overdrive or reverse rotation by selecting a stepless automatic speed change method. The transmission of FIG. 2, for example, comprises a speed change controlling system 80, a speed change system 10 and an overdrive system in series with one another. In particular, there are described an input shaft 12 having an input sun gear integral therewith. Surrounding the input shaft 12 is a so-called control shaft 20. The input shaft 12 extends from the speed change controlling system 80 through the speed change system 10 and ends at an output ring gear. The described transmission speed change system 80 also comprises input differential gears 34 and output differential gears 38.

There appear to be similarities between Ra and a Transgear™ gear assembly of the present invention where Transgear is a common law trademark of Differential Dynamics Corporation of Owings Mills, Md. For example, Ra shows an input shaft 12 having an input sun gear 14, and there is shown a control for output (speed change system 10) in FIGS. 1-3 such that, according to the Ra Abstract, "A stepless automatic variable transmission with gears in a state of constant meshing which is operational without the need for disengaging or changing the gears such that the rotational output power can be varied to effect a neutral, low speed, medium speed, high speed, overdrive or reverse rotation by selecting a stepless automatic speed change method or a manual speed change method and which includes a speed change system, an overdrive system and a speed change controlling system."

Input shaft 12 turns an input sun gear 14. The input sun gear 14 of Ra turns an "input differential gear" 34, 34AA which has a "locking pin" 30, 30A. This "locking pin" 32A may incorrectly describe a "second carrier pin" of a Transgear gear assembly. Also, an "output gear 46" is actually an output ring gear 46 (not a sun gear). In actuality, Ra's output ring gear 46 is meshed to output differential gears 38, 38A having an opposite locking pin 32, 32A to locking pin 30, 30A. The input side seen in speed change system 10 at the top of FIG. 2 is meshed to a sleeve which reaches to speed change controlling system 80 and speed change controlling system 80 reaches back to output differential gears 38, 38A and finally to output ring gear 46.

Also, a basic spur gear Transgear gear assembly appears on its face to have features of Ra embodiments described between FIG. 26 and FIG. 38 and so Applicant conducted a further analysis of for example, the embodiment of FIG. 34 to see if there are similarities to Applicant's spur gear Transgear gear assembly. Applicant has performed an analysis of Ra with emphasis on embodiments described by Ra that are alternative embodiments (FIGS. 26-38) and comments as follows: A portion of FIG. 34 of Ra, U.S. Pat. No. 5,525,116 issued on Jun. 11, 1996, shows an embodiment described in Cols. 46-47. Specifically at Lines 34-37 of Col. 47, the description reads: "To engage the overdrive system, the overdrive brake means 679 applies a rotational brake force to the tube shaft boss 762 of the carrier 764."

Understanding of the Ra Patent: From our analysis, the planetary gears 772 and 774 are numbered separately, but comprise a unitary construction, a gear (a single gear), planetary gear 772, 774, which is meshed with two gears, input gear 714 and output gear 722. (There is no control except arguably a brake means 679). Related gears 772B and 774B shown in FIG. 34 are turned by this one gear 772, 774 which is meshed with input 714 and output 722.

Analysis of the Ra Patent: The objective is selectively engaging or dis-engaging output gear 722 from input gear 714. Let us examine two cases: Case 1: Tube Shaft Boss 762 is held by the Brake Means 679. In this case, input gear 714 is meshed to planetary gear 772-774 and the planetary gear 772-774 is meshed to output gear 722. The output gear 722 is engaged to the input gear 714 in this case.

Case 2: Tube Shaft Boss 762 is not held by the Brake Means 679 and free to rotate. This time, output gear 722 must be dis-engaged from the input gear 714. Let us suppose the output gear 722 is held and not rotating. The output gear 722 is meshed to the planetary gear 772-774, and the planetary gear 772-774 is meshed to the input gear 714. If the output gear 722 is held and not rotating, the input gear 714 cannot be rotated. Therefore, the embodiment cannot be dis-engaged as described. Consequently, we believe that the embodiments represented by FIG. 34 in the Ra patent cannot be operated as described.

There remains a need in the art for an improved Transgear gear assembly that may have multiple variables wherein the multiple variables may comprise various functionality, for example, two inputs, a control and one output; one input, two controls and one output; and one input, one control and two outputs (that is, a single Transgear gear assembly having four variables), and thus meet the needs of a plurality of applications in turbines, vehicles, engines, compressors, pumps, transmissions and the like.

Summary of the Several Embodiments of a Transgear Gear Assembly Having Three or Four Variables This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

Three variable mechanical controls may be used to convert variable input to constant output or constant input to variable output, for direction control or other turning radius control purposes such as to accumulate two inputs into an output or provide one input, one control and one output. By providing combinations of two three variable Transgear gear assemblies, one may obtain four variables; however, it is desirable if a single Transgear gear assembly apparatus may provide four variables. By "variable" is intended one or more of three types of variables: input, output and control, analogous to an electronic transistor. Mechanical controls are efficient and scalable. All gear assemblies having three variables, for example, input, output, and control, will be called "Transgear" gear assemblies in this "transistor" context. These three variables, input, output and control, may be applied equally to, for example, an input shaft having an input sun gear, an input sleeve, an output sleeve to carrier gears and assemblies, to ring gears, bevel gears, miter gears, sun gears, carriers and spur gears of various shapes, sizes and meshings.

A first control technology described herein may be referred to as three variable control. Three variable control may be utilized in, for example, a bevel gear Transgear gear assembly, a miter gear Transgear gear assembly, a ring gear Transgear gear assembly and a spur gear Transgear gear assembly. All such assemblies may have three variables, input, output and control and combinations thereof such as two inputs accumulated to an output. Practically any component of such a three variable Transgear gear assembly may in one application be assigned to one of the three variables, input, output and control. For example, a sleeve surrounding a shaft may be an input, an output or a control for a ring gear, spur gear, bevel gear, carrier, sun gear, planetary gear or a shaft. Moreover, two input variables may be combined, for example, in a spur gear Transgear gear assembly or accumulated to achieve an output (which second input may have been otherwise assigned as a control variable and so serve as a second input variable).

Input compensated infinitely variable motion control may comprise two independent inputs, a drive input and a control input, and an output for a three variable control motion control. A system of variable output may be achieved by releasing the drive input so that the output may be varied.

In three variable control ring gear Transgear gear assemblies, the assemblies may comprise a number of planetary gears such as three, four or more planetary gears which are evenly spaced within and mesh with an outer ring gear and also are carried by a carrier. It is believed that a minimum of three planetary gears is required for a ring gear Transgear gear assembly stability. A three variable (3V) ring gear assembly, for example, may take the form of a shaft attached to carrier assembly embodiment (FIG. 5A) or a sleeve version (FIG. 5B).

In three variable control spur gear Transgear gear assemblies, the assemblies may comprise sets or pairs of planetary gears carried by carriers and spaced about and meshing with at least one sleeve portion surrounding a central shaft. Moreover, planetary gears may comprise various sizes and shapes and spur gear assemblies are frequently used in pairs in which each pair of planetary gear comprises one planetary gear which meshes with the other planetary gear which may have a larger or smaller diameter or width. Additionally, a double width planetary gear may be used to mesh with two other gears such as a sun gear and another planetary gear. Planetary gears for a four variable (4V) spur gear assembly may be utilized in pairs of different sizes for different control features as will be further described herein. Also, sun gears associated with shafts or sleeves may have different size diameters.

A fourth variable may be added to the concept of a three variable Transgear gear assembly. In such a Transgear gear assembly, the fourth variable may be a second control variable, a second input variable, or a second output variable. The four variables may comprise an input, first and second controls and an output for, for example, forward and reverse direction control. Also, the fourth variable in other embodiments may comprise a second input so that the four variables are input 1, input 2, control and output. In particular, as will be described herein, the fourth variable may comprise an added ring gear to a three variable spur gear Transgear gear assembly or an added bevel gear to a basic three variable bevel gear Transgear gear assembly. A four variable (4V) bevel gear assembly may comprise three shafts orthogonal to one another, one of which may carry a double bevel carrier gear. In 4V ring gear assembly embodiments, one may add one or more spur gear assemblies to achieve a 4V ring gear assembly. Other variations and embodiments of a Transgear gear assembly may comprise more variables than four by, for example, adding, in series or in parallel, a second three variable or four variable Transgear gear assembly.

These several technologies may be further described with reference to particular applications as bevel gear Transgear, miter gear Transgear, ring gear Transgear, spur gear Transgear and combination spur gear and outer ring gear Transgear gear assemblies. The four variable Transgear gear assembly will be introduced in detail by, for example, adding an additional ring gear to a three variable spur gear Transgear gear assembly.

BRIEF DESCRIPTION OF THE DRAWINGS

The features and advantages of the present invention will become more apparent from the detailed description set forth below when taken in conjunction with the drawings in which like reference numbers may indicate identical or functionally similar elements. Moreover, the first numeral of a reference number indicates in which figure that reference numeral first appears.

Three Variable Transgear Gear Assemblies

FIG. 1A is a front view of a bevel gear Transgear gear assembly 100 and FIG. 1B is a side view of the same bevel gear Transgear gear assembly 100 as is shown in FIG. 1A. Reference numerals are used in a convention such that the first numeral of a reference numeral such as reference numeral 100 represented the first time in the drawings where such a bevel gear Transgear gear assembly is shown in FIG. 1A through FIG. 18O. Simply, shaft 101 has a gear 102 integral with or attached to shaft 101 extending through the Transgear gear assembly 100 having opposite shaft portions 106 and 106B for carrying carrier bevel gears 103, 103B which mesh with gears 102 and 104 that all surround the shaft 101. A carrier center block portion 105 supporting carrier shafts 106, 106B also surrounds the shaft 101 as seen in FIG. 1B.

FIG. 2A is a front view of a further bevel gear Transgear gear assembly 200 similar to assembly 100 while FIG. 2B is a front view of a further bevel gear assembly 250 (sleeve version). FIGS. 2A and 2B demonstrate that assemblies 200 and 250 may have gears attached to either a shaft, for example, shaft 210 or to a sleeve, for example, sleeves 202 or 204. In assembly 200, a carrier center block portion 212 that surrounds shaft 210 may have carrier shafts/pins 211 and 211B3. Carrier shafts/pins 211 and 211B carry bevel carrier gears 213 and 213B. Carrier gears 213, 213B mesh with a gear attached to or integral with sleeve 214.

Referring to FIG. 2B, one may notice in assembly 250 that the carrier shaft 201, 215, 215B is equivalent to assembly 200 because it carries bevel gears 203 and 203B. The variable Input in assembly 250 may comprise a shaft and carrier component 201 extending through the Transgear gear assembly 250. In assembly 250, a Control may be provided by first sleeve and gear 202 and the Output variable may be provided by second sleeve and gear 204 meshed with carrier gears 203, 203B. Components of the embodiments 100, 200 or 250 can be modified to make the assignment of variable Input, Output and Control vary, for example, the Input may be the Output and vice versa.

FIGS. 2C and 2D show respective bevel gear assemblies 270 and 275 in side view. Assembly 270 has two idle (carrier) gears and assembly 275 has four idle (carrier) gears. Idle (carrier) gears are positioned in a circular configuration, and there may be one, two, three, four or more sets of idle (carrier) gears. For example, with three idle gears (not shown), the three idle gears are positioned at 120 degrees about a circle while with four idle gears, (assembly 275) the idle gears are positioned at 90 degrees about a circle (two idle gears spaced at 180 degrees from one another are shown in FIG. 2C).

FIG. 3A, FIG. 3B, FIG. 3C and FIG. 3D are an introduction to miter gear Transgear gear assemblies represented by assemblies 300 (shaft) and 350 (sleeve) equivalent versions. Miter gear Transgear gear assemblies consist of the same size bevel gears. The front views. FIG. 3A and FIG. 3B of two three variable control miter gear Transgear gear assemblies 300 and 350 again indicate that each may have gears attached to shafts 301 or to sleeves 304, 302, 308. In assembly 300, for example, carrier shafts 310, 310A for carrier gears 306, 306A have a carrier block portion 316 which surrounds the shaft 301. In FIG. 3B, assembly 350, there is an equivalent shaft 314 to shaft 301 and carrier block 316, carrier shaft 310 of FIG. 3A. Assembly 350 is thus the sleeve equivalent of shaft assembly 300 having carrier gears 312, 312A which mesh with first, left sleeve 302 and second sleeve 308. FIG. 3C is a side view of the same miter gear Transgear gear assembly with two idle gears spaced at 180 degrees from one another. FIG. 3D is a side view of a miter gear Transgear gear assembly having three idle gears spaced at 120 degrees from one another. The operation of FIGS. 3A, 3B, 3C and 3D is analogous to that of FIGS. 2A, 2B, 2C and 2D.

FIG. 4A is a front view of a three variable ring gear Transgear gear assembly 400, and FIG. 4B is a side view of the same ring gear Transgear gear assembly 400. Three planetary gears, 412, 414, 416 spaced at 120 degrees apart on pins 406, 408, 410 are best seen in side view FIG. 4B. The shaft 401 is spaced by bearings, spacers or bushings from, for example, the sleeve of ring gear 404. A carrier assembly comprises carrier brackets 403, 403A, 405, 405A for holding pins 406, 408, 410 for the planetary gears 412, 414, 416 meshed with the outer ring gear 404 and the shaft 401 and sun gear 402. As will be further discussed herein, ring gear assemblies may comprise different width and different diameter sets or pairs of planetary gears and so form a four variable (4V) ring gear assembly.

FIG. 5A is a front view of a three variable ring gear Transgear gear assembly 500 comprising a carrier bracket 522, 522A, 527, 527A of shaft 521 and a sun gear 531 of sleeve 530. As seen in FIG. 5A, carrier assemblies may be attached to a shaft 521 and a gear 531 may be attached to a sleeve 530 (right sleeve 530 with integral or attached sun gear 531). The carrier bracket carries pins 523, 533 (a third pin is not numbered) for planetary gears 524, 534, 535. Shaft 521 turns carrier 522, 527, 522A, 527A in the same direction of rotation. The carrier 522, 527, 522A, 527A carries planetary gears 524, 534, 535 which mesh with ring gear 526 and with sun gear 531 of sleeve 530. The three variables may be assigned, for example, to the shaft/carrier 521, the ring gear 526 and the sleeve 530.

FIG. 5B is a front view of a ring gear Transgear gear assembly 525 where the shaft 501 may have an attached or integral sun gear 502. Sun gear 502 meshes with planetary gears 512, 514, 516 which in turn mesh with ring gear 504. The three variables may be the shaft 501, the ring gear 504 and the carrier sleeve 538. Three sets of planetary gears and pins are seen in FIG. 5C spaced at 120 degrees and four sets of planetary gears and pins are seen in side view FIG. 5D spaced at 90 degrees. There may be three, four or more planetary gears (three planetary gears 524, 534, 535, for example, in assembly 500 and three planetary gears 512, 514, 516 in assembly 525).

FIG. 6A and FIG. 6B is an introduction to a basic three variable spur gear Transgear gear assembly 600. One will note that in assembly 600 the diameter of left and right sun gears of sleeves 602, 603 are the same. FIG. 6A is a front view of a three variable spur gear Transgear gear assembly 600 and FIG. 6B is a side view of the same spur gear Transgear gear assembly 600. Two sets of planetary gears 608, 610 and 608A, 610A spaced 180 degrees from one another are seen in FIG. 6B having the same diameter. Note that the pins 607, 609 support planetary gears 608, 610 respectively and are seen in side view FIG. 6B. The pins 607, 609 are supported by carrier brackets 612, 613. The A in 608A and 610A represent the second set of planetary gears at the bottom of FIGS. 6A and 6B. The two sets of sun gears and two sets of planetary gears make three gear widths total.

FIG. 7 provides a perspective view of a basic spur gear three variable Transgear gear assembly 700 having a shaft integral with or attached to a left sun gear (which may be a first assigned variable, input, output or control). In this embodiment the gear assembly 700 may be five gears wide. On the other hand, if a carrier gear is a carrier disc, the assembly 700 may be four gears wide (not shown). A first variable may be the left sun gear. A second variable may be the carrier gears. A third variable may be the right sun gear. There are also shown two sets (pairs) of planetary gears, the lower pair being indicated as Planetary Gears. Left Sun Gear (Variable #1), Carrier Gears (Variable #2) and Right Sun Gear (Variable #3) are also shown.

FIG. 8A, FIG. 8B, FIG. 8C and FIG. 8D all show basic three variable spur gear Transgear gear assemblies, FIGS. 8A and 8B in front view show the equivalent shaft and sleeve embodiments respectively, and FIGS. 8C and 8D show two and three planetary gear sets respectively in side views. Gears may be attached to either shafts or to sleeves. For example, in assembly 800, carrier brackets 817, 818, 817A, 818A support shafts/pins (unlabeled). There may be one, two, three or more sets of two planetary gears each, here, all of equal diameter (here, two and three sets shown in FIGS. 8C and 8D). Typical components of shaft assembly 800 comprise a shaft 801 having a left sun gear 802 integral with or attached to the shaft 801 that may extend through the assembly 800. On the other hand, input carrier shaft 810 extends through assembly 850 and has a carrier center bracket 820 (carrier center bracket 820 is attached to carrier brackets 809 and 811 but not shown). However, there is a first sleeve and left sun gear 812 and a second sleeve and right sun gear 814 in assembly 850 surrounding carrier shall 810 at respective ends. Planetary gears 805, 806; 815, 816, their pins and carriers are shown in the middle portion of each assembly held by carrier brackets 817, 818, 817A, 818A; 809, 809A, 811, 811A. When input shaft 810 of assembly 850 is rotating clockwise and control sleeve 812 is held, the output sleeve 814 rotates in the same direction as the input 810. FIGS. 8C and 8D show respective side views with two sets of two planetary gears each shown in FIG. 8C spaced 180 degrees apart and three sets of two planetary gears each spaced 120 degrees from one another in FIG. 8D. As will be further discussed herein, spur gear assemblies may comprise different width and different diameter sets or pairs of planetary gears and have a ring gear and sleeve and so form a four variable (4V) ring gear assembly.

FIG. 9A, FIG. 9B, and FIG. 9C depict front and side views of a basic three variable spur gear Transgear assembly with planetary gears having the same diameter. FIG. 9A is a front view of a basic spur gear Transgear gear assembly 900 having three variables with first and second sleeves 912 and 914 having different diameter sun gears, the second sun gear having a larger diameter that the first. When same size diameter and width planetary gears are meshed with these different diameter sun gears, one may understand that the two sets of two planetary gears in FIG. 9B assembly 950 side view are shown such that the planetary gears of a set of two planetary gears are slightly offset from one another and spaced at 180 degrees from one another. There may be one, two, three or more sets of planetary gears. In FIG. 9C, there is shown a side view of the basic spur gear Transgear gear assembly 975 but having three offset sets of two planetary gears each, offset due to the different diameters of the sun gears of left sleeve 912 and right sleeve 914. Because the planetary gears have the same diameter, the rotational velocity of first sleeve 912 may be faster than the rotational velocity of sleeve 914.

FIG. 10A, FIG. 10B, and FIG. 10C depict front and side views of a basic three variable spur gear Transgear assembly with planetary gears having different diameters. FIG. 10A is a front view of a basic three variable (3V) spur gear Transgear gear assembly 1000 having three variables with first and second sleeves 1002 and 1003 having different diameter sun gears, the right sun gear 1003 having a larger diameter than the left sun gear 1002. When different size diameter and width planetary gears 1005, 1007, 1005A, 1007A are meshed with these different diameter sun gears, one may understand that the two sets of two planetary gears in FIG. 10B assembly 1050 side view are shown such that the planetary gears of a set of two planetary gears are slightly offset from one another, have different diameters and are spaced at 180 degrees from one another. In FIG. 10C, there is shown a side view of the basic spur gear Transgear gear assembly 1075 but having three offset sets of two planetary gears each of different diameters, offset due to the different diameters of the sun gears of first (left) sleeve 1002 and second (right) sleeve 1003. Here the larger sized diameters of planetary gear 1005 versus planetary gear 1007 (and 1005A versus 1007A) compensate for the smaller diameter of first sleeve left sun gear 1002 compared with larger second sleeve right, sun gear 1003, and the relative rotational velocities of the first sleeve 1002 and second sleeve 1003 may be very close or the same.

FIG. 11A is a front view of a basic spur gear Transgear gear assembly 1100 having three variables to demonstrate that a shaft 1101 extending through the assembly 1100 may have an integral or attached sun gear 1102 having a larger diameter than a right sun gear of surrounding sleeve 1103. To compensate, a double width planetary gear 1105 may mesh with left sun gear 1102 and with single width, smaller diameter planetary gear 1106. Single width planetary gear 1106 may mesh with larger planetary gear 1105 and with sleeve 1103 right sun gear (as seen in assemblies 1150 and 1175). Carrier brackets 1110, 1110A and 1111 and 1111A form a carrier assembly that carry the pins supporting the planetary gears.

FIG. 11B and FIG. 11C are side views of the basic spur gear Transgear assembly of FIG. 11A having two sets of planetary gears and three sets of planetary gears, respectively. In embodiment 1150 shown in FIG. 11B, there are two sets of two offset planetary gears 1105, 1106; 1105A, 1106A shown spaced at 180 degrees from one another. In embodiment 1175 shown in FIG. 11C, there are three sets of two offset planetary gears (of different diameters and gear widths) spaced 120 degrees from one another.

FIG. 12A is a front view of a basic spur gear Transgear assembly 1200 having just two gear widths. Assembly 1200 has three variables where planetary gear 1205 is double width (a double gear) but smaller in diameter than single width planetary gear 1206. Shaft 1201 has a larger diameter sun gear that meshes with planetary gear 1205, and planetary gear 1205 meshes with planetary gear 1206 and gear 1206 meshes in turn with a sun gear of smaller diameter sleeve 1203 so that the rotational speeds of 1201 and 1203 may be similar.

FIG. 12B is a front view of the basic spur gear Transgear gear assembly 1250 having two sets of two planetary gears 1205, 1206 each as per front view FIG. 12A spaced at 180 degrees from one another.

In FIG. 12C, in assembly 1275, it may be seen that three sets of two planetary gears may have different diameters and gear widths and be spaced equally at 120 degree spacing about the center shaft 1201.

FIG. 13A (front view) and FIGS. 13B and 13C (side views) show another two gear width spur gear Transgear gear assembly 1300 with two sets of planetary gears 1305, 1306 in assembly 1350 and three sets of planetary gears in assembly 1375. FIG. 13A is a front view of a basic spur gear Transgear gear assembly 1300 having three variables wherein the planetary gear 1305 is double width (referred to herein as a double gear) and has different diameters where the a first (for example, left) side has a larger diameter than the second (for example, right side) of double gear planetary gear 1305 and meshes with a larger diameter left sun gear of shaft 1301. Planetary gear 1306 may have a single width (referred to herein as a single gear) compared to double planetary gear 1305 and may have a similar diameter to the diameter of the left side of double planetary gear 1305 and mesh with smaller diameter right sun gear of sleeve 1303. FIG. 13B is a side view of two sets of two planetary gears 1305, 1306 as per FIG. 13A and represents spur gear Transgear gear assembly 1350. FIG. 13C is a side view of three sets of two planetary gears each, spaced at 120 degrees from one another in basic spur gear Transgear gear assembly 1375.

FIG. 14A, FIG. 14B and FIG. 14C are intended to represent the principle of designing a predetermined ratio between the left and right sun gears. FIG. 14A is a front view of a basic spur gear Transgear gear assembly 1400 having three variables wherein the planetary gear 1405 is a double width double gear and has different diameters where the one (for example, the left) side has a larger diameter than the right side of planetary gear 1405 and meshes with a different diameter sun gear of shaft 1401. Another double width double planetary gear 1406 may have a similar left and right diameter when compared to planetary gear 1405 and so have a similar left side diameter to the diameter of left side of double planetary gear 1405 and mesh with same size diameter right sun gear of sleeve 1403 as the sun gear of shaft 1401. FIG. 14B is a side view of two sets of two planetary gears 1405, 1406 as per FIG. 14A spaced 180 degrees from one another and represents spur gear Transgear gear assembly 1450. FIG. 14C is a side view of three sets of two double planetary gears each, spaced at 120 degrees from one another in basic spur gear Transgear gear assembly 1475.

FIG. 15A, FIG. 15B and FIG. 15C (all front views) show a further spur gear Transgear gear assembly set 1500, 1550 and 1575 in which, for example, left sleeve 1501 of assembly 1500 may be assigned a first Input #1. A second surrounding sleeve 1502 and attached or integral sun gear may be assigned a second Input variable input #2 and the Output variable may be right sleeve 1503 and attached or integral sun gear. FIG. 15A is a front view of a basic spur gear Transgear gear assembly 1500 having three assigned variables as above, but the Input, Control and Output variables may be assigned differently as per FIGS. 15B and 15C. FIG. 15B is a front view of a similar basic spur gear Transgear gear assembly 1550 as assembly 1500, but right outer sleeve 1552 and integral or attached sun gear and left sleeve and integral sun gear 1551 may be assigned as Input #1 and Input #2 respectively and shaft 1553 may be the Output variable. In FIG. 15C, it may be seen that there are two sleeves, inner right sleeve 1576 and outer right sleeve 1577 that may be assigned as Input #1 and Input #2, and the Output may be left sleeve 1578. These figures also demonstrate that a Transgear gear assembly may be used as an accumulator of first and second inputs without a control to provide an accumulated output or one of the inputs may be assigned as a control in such a three variable Transgear gear assembly. Planetary gears are shown to be similar in diameter size and single width in each of assemblies 1500, 1550 and 1575.

Four Variable Transgear Gear Assemblies

FIG. 16A, FIG. 16B and FIG. 16C provide mechanical diagrams and may be used as an introduction to a four variable spur gear Transgear gear assembly shown in FIGS. 17A and 17B. FIGS. 16A, 16B and 16C are identical to FIGS. 8B, 8C and 8D which serves as an introduction, to the concepts of a 4V Transgear gear assembly. FIG. 16A is a front view of a four variable spur gear Transgear gear assembly 1600 without showing an added ring gear. The added ring gear (not shown) may be used to convert a 3V spur gear Transgear gear assembly of FIG. 8B to a 4V spur gear Transgear gear assembly 1600, 1700, 1750. FIG. 16B is a left side view of a four variable spur gear Transgear gear assembly 1650 having first and second sets of planetary gears of two planetary gears each of same size and gear width spaced 180 degrees from one another (without the added ring gear) 1607, 1607A and 1608, 1608A. FIG. 16C is a left side view of a four variable spur gear Transgear gear assembly 1675 having first, second and third sets of planetary gears of two planetary gears each of same size and gear width spaced 120 degrees from one another (without the added ring gear). Referring to FIG. 16A, there may be seen two sets (pairs) of planetary gears: starting from top, gears 1608, 1607; 1607A, 1608A. Referring to FIGS. 16A and 16B, there may be seen that an Input variable may be assigned to shaft 1601 having a sun gear integral with or attached to the shaft. Shaft 1601 is also attached to or integral with carrier 1603A, 1603B, 1603C and 1603D. A first control, Control #1, may be a sleeve integral with or attached to a left sun gear 1602. A second control, Control #2, may be the added ring gear (to a basic three variable spur gear Transgear gear assembly)(not shown) extending around the four sets of planetary gears and carriers as shown in FIGS. 17A and 17B. The output may be assigned to a second sleeve (at the right) 1606 which is integral with or attached to a right sun gear 1606. As will be described herein, the four variable Transgear gear assembly may function as a direction control by holding Control #1 or holding Control #2 such that the Output 1606 may have the same or opposite rotational velocity direction as the input 1601 and carrier assembly, carrier center block, carrier brackets and carrier pins.

FIGS. 17A and 17B provide an overview of how, for example, direction control may be provided in a four variable spur gear Transgear gear assembly 1700, 1750 with an added ring gear 1706. Assembly 1700 has been simplified from assembly 1600 of FIG. 16A and does not show a left end of the pin for the planetary gear 1712. Three sets of equal diameter planetary gears are shown at 120 degrees relation to one another in assembly 1750 of FIG. 17B, side view (but there may be a two sets embodiment or a four sets embodiment not all shown in FIG. 17A). FIG. 17A is a front view of a four variable spur gear Transgear gear assembly 1700 having, for example, an Input at carrier shaft 1701. The similarly cross-hatched components utilized with added ring gear 1706 and helping to comprise an assembly with shaft 1701 include carrier assembly 1703A, 1703B, 1703C and 1703D and unlabeled pins for, for example, planetary gears 1711, 1712, Control #2 (C#2) is provided by added ring gear 1706. Control #1 (C#1) is provided by the left sun gear and sleeve 1702 as will be discussed with reference to FIGS. 17A and 17B. The output may be second sleeve 1709 meshed with second planetary gear assembly 1712.

Referring now to FIGS. 17A and 17B, in each figure the Input 1701 is assumed to be clockwise. The output is changed in direction by holding one of the controls (C#1 or C#2) in turn. Referring now to Control #2 (added ring gear 1706), gear 1706 may be locked in which case the Input 1701 may be clockwise and then the Output 1709 may be counter-clockwise (the opposite direction). When control #1 (sun gear and sleeve 1702) is locked, the Input may be clockwise and the Output may be clockwise (the same direction of rotation). With 1706 locked, the meshed planetary gears, 1711, 1712 are neutral (free to rotate) with meshed added ring gear 1706 and so turn output 1709 counter-clockwise. With the added ring gear 1706 locked, the sleeve 1702 is free to rotate or neutral and output 1709 rotates counter-clockwise.

FIG. 18A is a front view of a four variable bevel gear Transgear gear assembly 1800; FIG. 18B is a side view of the same four variable bevel gear Transgear gear assembly 1800 and FIG. 18C is a top view. The four variable bevel gear Transgear gear assembly 1800 is missing a right outer sleeve and sun gear seen in FIGS. 18H through 18O but provides an introduction to this assembly. Direction control in a four variable bevel gear Transgear gear assembly 1800 occurs in the same manner as described above for a four variable spur gear Transgear gear assembly 1700 by holding one of Control #1 and Control #2 for a forward or a reverse direction Output.

FIGS. 18A through 18O show in sets of three Figures each such as FIG. 18A front view, FIG. 18B side view and FIG. 18C top view, how the four variable bevel gear Transgear assembly may function as a direction control by holding control #1 and then holding control #2. Referring to FIGS. 18A, 18B and 18C, it may be seen that orthogonal carrier shafts (for carrier gears) 1801, 1821, 1841 are centered about center lines. It may be understood that shaft assembly 1801 may be assigned as an Input variable and when it turns clockwise, so turns a cross or central shaft 1821, shaft 1841 and carrier block portion thereof in the same clockwise direction. As 1801 turns clockwise with the central shafts 1821 and shaft 1841, so must inner carrier bevel gears 1805A and 1805B rotate if left sleeve and bevel gear 1802 are held. In general, if one of 1802 (Control #1) or another component (Control #2) not shown yet is held, then, the other sleeve bevel gear of 1808 must rotate because it is meshed with turning carriers 1805A and 1805B. Outer larger bevel gears 1804A and 1804B are also carried by carrier shaft 1821 when shaft 1801 rotates. There are three shafts, input shaft 1801, carrier shaft 1821 and another carrier shaft 1841 seen in FIGS. 18A and 18C as sharing the same carrier block portion. When shaft 1801 is assigned as Input variable, the assembly of shafts 1801 and 1821 and carrier block rotates around the center line of shaft 1801.

In FIG. 18D (front view), FIG. 18E (side view) and FIG. 18F (top view), the beveled gears 1806A and 1806B are added to FIGS. 18A, 18B and 18C. Component 1806B will be considered in relation to what has been explained above with respect to the clockwise input and holding of control #1 (or control #2). Since gears 1806A and 1806B are meshed with carrier gears 1804A and 1804B, gears 1806A and 1806B must rotate in the opposite direction from carrier gears 1804A and 1804B. The output variable is still not shown in FIGS. 18D through 18F.

In FIG. 18G (front view), FIG. 18H (side view) and FIG. 19I (top view), the output outer sleeve 1810 is now shown. Components 1806A, 1806B have a beveled edge and are meshing with outer sleeve and output gear 1810. The beveled gears 1806A, 1806B will be considered with respect to output variable assignment to outer beveled gear and sleeve 1810.

Now in FIG. 18J (front view), FIG. 18K (side view) and FIG. 18L (top view), it will be discussed how holding (Control #1) with a clockwise input applied to shaft 1801 impacts the turning of Output variable 1810. Central shaft 1801 turns outer bevel carrier gears 1804A, 1804B counter-clockwise with left sleeve 1802 held. The counter-clockwise rotation of carrier gears 1804A and 1804B means that added gears 1806A and 1806B will rotate clockwise being meshed together. Since gears 1806A and 1806B drive outer sleeve 1810, the outer sleeve 1810 will provide a counter-clockwise output.

On the other hand, with reference to FIGS. 18M, 18N and 18O, it will be discussed how holding sleeve 1808 (Control

2) impacts the direction of turn of output variable 1810. The central shaft 1801 will still be rotating clockwise, but now holding 1808 will cause carrier bevel gears 1805A and 1805B to rotate clockwise. Then, outer gear 1806A, 1806B rotate counter-clockwise and so output gear and sleeve 1810 must rotate clockwise which is the same direction as input 1801.

These applications of variations and technologies of infinitely variable motion control (IVMC) with respect to embodiments of Transgear gear assemblies will be further described in the detailed description of the drawings which follows.

DETAILED DESCRIPTION

The present invention is directed to three variable and four variable infinitely variable motion control (IVMC) Transgear gear assemblies in generators, transmissions, vehicles, turbines (wind and river) and pumps/compressors wherein Transgear gear assemblies are used for control. A plurality of different examples of Transgear assemblies having three variables will be described with reference to FIGS. 1A-15C, beginning with a bevel gear assembly, a miter gear assembly, a ring gear assembly and a plurality of embodiments of a spur gear assembly. FIGS. 16A through 18O are directed to four variable Transgear gear assemblies.

Transgear #1: Bevel Gear Transgear

A bevel gear assembly 100, for example, shown in FIGS. 1A (front view) and 1B (side view), is an example of a Transgear gear assembly having three variables, input, output and control (or in an alternate application, for example, two inputs and a control or two inputs and an output). Bevel gear Transgear gear assemblies may be used, for example, as differentials, speed control, direction control or other three variable uses, and their application for direction control will be explained with reference to four variable embodiments.

Referring to front view FIG. 1A, assembly 100 (shaft embodiment), for example, input gear 102 may be attached to and may be integral with input shaft 101 (extending the length of assembly 100 and also seen in the center of corresponding side view FIG. 1B). Carrier gears 103 and 103B are meshed to input left sun gear 102 and rotate freely on carrier shaft/pin 106 and 106B. Output gear and sleeve 104 is meshed to carrier gears 103 (at bottom) and 103B (at top) and provides an integral output shaft in the form of a right sleeve and output bevel gear 104 external to and surrounding the input shaft 101 which extends through the assembly 100 in FIG. 1A. Carrier shaft/pin 106, 106B is attached to carrier center block portion 105 which surrounds input shaft 101. Carrier bevel gears 103, 103B are assembled around the carrier pin/shaft 106, 106B respectively and rotate freely. When an input is connected to rotate input shaft 101 (for example, motor or propeller driven by wind or water) and carrier assembly 105/106/106B is fixed (does not move), input gear 102 and output gear 104 rotate at the same speed/rpm but in opposite directions from one another. When an input is input shaft 101 and output gear 104 is fixed, carrier shafts 106, 106B rotate, for example, at one half the rotational speed of the input shaft 101 and gear 102 and in the same direction. Carrier gears 103 and 103B are idle gears spaced 180 degrees from one another. So, for example, carrier assembly 105/106/106B may be fixed or be neutral and may rotate and may control output based on input. The assembly 100 thus comprises a bevel gear Transgear gear assembly 100 with input, output and control.

The elements of the drawings, for example, denoted with "B" at the end of each reference numeral (see, for example, FIG. 1A, 1B, reference numerals 103, 103B, 106, 106B) refer to an extra set of components, such as carrier block portions, and carrier gears for other than a functional purpose. For example, carrier gear 103B may, however, provide greater torque capacity and dynamically balance the system when matched with carrier gear 103.

Transgear #2 and #3: Further Three Variable (3V) Bevel Gear Transgear Gear Assemblies Further, alternative bevel gear Transgear gear assemblies 200, 250, 270 and 275 are shown in FIG. 2A (front view) assembly 200 and FIG. 2B (front view) assembly 250 wherein FIG. 2A represents that an input may be a shaft 210 and integral bevel gear and, in FIG. 2B, an input may be a shaft 201 having a carrier block and carrier shaft portion 215, 215B may be an input. In either embodiment 200 or 250, three variable bevel gear Transgear gear assembly 200, 250 may comprise embodiments of a three variable bevel gear Transgear gear assembly similar to that shown in FIGS. 1A and 1B assembly 100. Bevel gear Transgear gear assemblies 100, 200 or 250 may be used to create different gear ratios depending on which shafts, gears or carrier to use as input, output, and control (fix or free, neutral). The assembly 100, 200 or 250 may provide speed control or provide accumulation of two inputs to an output, for example.

Referring to FIGS. 2A and 2B, a shaft 201, 210 extends through the Transgear gear assembly, (left to right in each of FIG. 2A and FIG. 2B and front to back in each of FIGS. 2C and 2D). In assembly 250, input shaft 201 comprises an integral or attached carrier center block and carrier shaft 215, 215B that is orthogonal and shown as a vertical shaft in FIGS. 2B and 2D. As this carrier shaft 215, 215B turns, so do corresponding carrier gears 203 and 203B which mesh with first (left) sleeve and bevel gear 202 which may provide a control variable and bevel gear 202. The Input variable may be associated with shaft 201 and its components. A first (left) surrounding sleeve and bevel gear 202 perform the Control variable and are labeled as 202. The left bevel gear portion 202 of left sleeve and bevel gear 202 meshes with corresponding carrier gears 203, 203B. Corresponding carrier gears 203, 203B mesh with second (right) bevel gear and sleeve 204. Right bevel gear and sleeve 204 may provide the Output variable. Control 202 may be held or be free or neutral. Control bevel gear and sleeve 202 when held allows the carrier shaft 215, 215B of the Input shaft 201 to rotate and so with carrier bevel gears 203, 203B rotating meshes with Output 204 to maintain the same direction of rotation. When control bevel gear and sleeve 202 is free or neutral, the Output 204 will be free wheeling. The control may be held or free or rotate in one or another direction at a different rotational velocity than the input to control speed and/or direction of output 204. Assembly 200 operates in the same manner as assembly 100. FIG. 2C, side view, shows two carrier gears spaced at 180 degrees from one another (also called idle gears). FIG. 2D shows four carrier gears spaced at 90 degrees from one another.

Transgear #4 or #5: 3V Miter Gear Transgear with Two, Three, Four or More Sets of Idle Gears A further embodiment of a 3V miter gear Transgear gear assembly 300, 350 is shown in front view FIG. 3A, 3B and side view FIG. 3C, 3D. While two or three idle gears are shown, there may be only one set of such idle gears.

Referring to FIG. 3A, front view, a left bevel gear is attached or integral to shaft 301 and a right sleeve and bevel gear 304 surround the shaft 301. In assembly 350, as left sleeve and bevel gear 302 turns, it meshes with both upper bevel gear 312 and lower bevel gear 312A. In assembly 350, shaft 314, which functions as a part of a carrier assembly, may be held or allowed to rotate to change rotational output at right bevel gear and sleeve 308 meshed with upper and lower bevel gears 312 and 312A. Each of bevel gears 312 and 312A rotate or are fixed depending on the status of shaft 314 (operating as a carrier).

In this manner, in assembly 300, the input variable may be shaft and bevel, gear 301, and the output right sleeve and bevel gear 304 may either rotate in the same or opposite direction as the input depending on the status of the carrier, fixing or rotating control carrier shaft 310. Upper and lower bevel gears 306A and 306B or 312 and 312A are denoted idle gears because they idle when, for example, shaft 314 (carrier) rotates so as to maintain the same direction of rotation at input and output. This miter gear Transgear gear assembly may be enhanced by adding one, two or three idle gears, three idle gears shown in FIG. 3D. In either Transgear #4 or #5 (assemblies 300, 350 respectively), the miter gear Transgear gear assembly has three components which may be variables: the left sleeve and bevel gear, the right sleeve and bevel gear and the carrier (or fixed or rotating shaft) for the idle gears. Input, output and control may be assigned to any of these three components, for example, 301, 302 and 304. While input, output and control have been discussed, the three variables may, for example, be first and second inputs for providing an accumulated output. While two idle gears are shown in FIG. 3C and three in FIG. 3D, a minimum is one idle gear, but there may be balance, wear and transfer problems if just one idle gear is used.

Miter gear assemblies may be used to similar purposes as bevel gear assemblies except creating different gear ratios. Ring gear Transgear gear assemblies, discussed next, may be used to create different gear ratios depending on which gears or carrier to use as input, output, and control (fix).

Side views FIGS. 3C and 3D show two and three idle gears respectively where two idle gears may be spaced at 180 degrees and three at 120 degree spacing.

Transgear #6: A 3V Ring Gear Transgear Gear Assembly with Three Planetary Gears Referring now to FIG. 4A (front view) and FIG. 4B (side view), there is shown a 3V ring gear Transgear gear assembly 400 with three planetary gears. Shaft 401 extends through the assembly 400. (As will be seen in FIG. 5A, there may also be an embodiment 500 with an integral carrier for planetary gears 522, 523). FIG. 4A is a front view of a three variable control ring gear Transgear gear assembly 400, and FIG. 4B is a side view of the same ring gear Transgear gear assembly 400. Three planetary gears. 412, 414, 416 spaced at 120 degrees apart on carrier shafts/pins 406, 408, 410 are seen best in side view FIG. 4B. Planetary gear 412 at top meshes with integral sun gear 402. Planetary gears 412, 414, 416 mesh with integral sun gear 402. These in turn are seen meshing with ring gear 404. One of the carrier brackets 403, 405, 403A, 405A or the ring gear 404 may be held or free to rotate. The shaft 401 is spaced by bearings, spacers or bushings from, for example, the sleeve of ring gear 404 and carrier assembly for planetary gears and pins. The sun gear 402 of shaft 401 may mesh with the planetary gears 410, 412, 414 held by carrier brackets 403, 403A, 405, 405A and the planetary gears mesh in turn with the ring gear 404. Variables are assigned to the shaft 401, the carrier assembly 403, 405, 403A, 405A and the ring gear 404.

Transgear #7 and #8: A 3V Ring Gear Transgear Gear Assembly with Three or Four Planetary Gears FIG. 5A is a front view of a three variable ring gear Transgear gear assembly 500 comprising integral carrier brackets 522, 523 of shaft 521 and sun gear 531 of right sleeve 530. As seen in FIG. 5A, gears and carrier assemblies may be attached to either a shaft 521 such as carrier brackets 522, 522A, 527, 527A or a sleeve 530 such as sun gear 531. FIG. 5B is a front view of a ring gear Transgear gear assembly 525 where the shaft 501 may have an integral or attached sun gear 502. Three planetary gears and shafts/pins are seen in FIG. 5C spaced at 120 degrees from one another and four planetary gears and pins are seen in side view FIG. 5D spaced at 90 degrees from one another. There may be three (a minimum), four or more planetary gears.

When input is connected to input shaft 501 and carrier assembly 538 is fixed, sun gear 502 becomes the input gear, the carrier assembly 538 may become the control, and ring gear 504 becomes the output, having a left side sleeve portion surrounding shaft 501 of the ring gear Transgear gear assembly 525. The angular velocity and the direction of rotation can be calculated by the formula below:

$$N_{sun} \cdot \omega_{sun} + N_{ring} \cdot \omega_{ring} = (N_{ring} + N_{sun}) \cdot \omega_{arm}$$

where N is the number of teeth (sun, ring), ω is angular velocity of the element (sun, arm/carrier, or ring) where the formula is found under epicyclic gearing in Wikipedia. Since the angular velocity and rpm are directly proportional, one may use the rpm instead.

As suggested above, a ring Transgear gear assembly such as assembly 500, 525 may be utilized to accumulate two inputs to an output and so the control carrier may be a second input. As suggested also above, any component of sun gear (of shaft 501), carrier and ring gear may be any variable of input, control and output.

Transgear #9: A 3V Spur Gear Transgear Gear Assembly with Two Sets of Two Equal Diameter Planetary Gears FIG. 6A and FIG. 6B are an introduction to a basic three variable spur gear Transgear assembly 600. One will note that, in assembly 600, the diameter of left and right sun gears of sleeves 602, 603 are the same. FIG. 6A is a front view of a three variable control spur gear Transgear gear assembly 600 and FIG. 6B is a side view of the same spur gear Transgear gear assembly 600. Two sets of two planetary gears each 608, 610; 608A, 610A spaced 180 degrees from one another are seen in FIG. 6B having the same diameter and meshed to one another. Note from FIG. 6A that the shafts/pins 607, 609 support planetary gears 608, 610 respectively and are seen in side view FIG. 6B. The A in 608A and 610A represent the second set of planetary gears at the bottom of FIG. 6B. The two sets of sun gears and two sets of planetary gears make three gear widths total. Carrier assembly 612, 613, 607, 609, 608, 610 is attached to shaft 601 by carrier center bracket 611. Input, output and control variables may be assigned to any of shaft 601, first sleeve and sun gear 602 and second sleeve and sun gear 603.

Transgear #10: Another 3V Spur Gear Transgear Gear Assembly in Perspective View FIG. 7 provides a perspective view of a basic spur gear three variable Transgear gear assembly 700 having a shaft integral with or attached to a Left Sun Gear (which may be a first assigned variable, input, output or control with Variable #1 shown). In this embodiment, the gear assembly may be five gears wide as shown: left sun gear, carrier gears and planetary gears, and right sun gear. On the other hand, if a carrier gear is a carrier disc, the assembly 700 may be four gears wide (not shown). A first variable may be the left sun gear. A second variable may be the carrier gears. A third variable may be the right sun gear. There are also shown two sets (pairs) of planetary gears, the lower pair being indicated as Planetary Gears.

Transgear Gear Assembly #11 and #12: The Basic Spur Gear Transgear Gear Assembly with Three Variables In FIGS. 8A and 8B, there are shown basic 3V spur gear Transgear gear assemblies 800 and 850, 800 being the shaft equivalent to sleeve embodiment 850. FIG. 8A, FIG. 8B, FIG. 8C and FIG. 8D all show basic three variable spur gear Transgear gear assemblies, FIGS. 8A and 8B in front view show the equivalent shaft and sleeve embodiments and FIGS. 8C and 8D show planetary gear sets in sides view. Gears may be attached to either shafts or to sleeves. For example, in assembly 800, carrier brackets 817, 818, 817A, 818A support shafts/pins (unlabeled) for planetary gears. There may be one, two, three or more sets of two planetary gears each, here, all of equal diameter; (here, two and three sets shown in FIGS. 8C and 8D respectively). An upper set of planetary gears 805, 806 shown meshed together and of equal diameter are shown at the top of FIGS. 8A and 8C and a like set of planetary gears are shown at the bottom of FIGS. 8A and 8C as 805A and 806A. Typical components of assembly 800 comprise a shaft 801 having a left sun gear 802, 804 either integral with or attached to the shaft 801 that may extend through the assembly 800. On the other hand, input carrier shaft 810 extends through assembly 850 and has a carrier center block 820. However, there is a first sleeve and left sun gear 812 and a second right sleeve and right sun gear 814 in assembly 850 surrounding carrier shaft 810 at respective ends. Planetary gears, their shafts/pins and carrier brackets are shown in the middle portion of each assembly, for example, held by carrier bracket portions 809, 809A, 811, 811A. FIGS. 8C and 8D show respective side views with two sets of two planetary gears each shown in FIG. 8C spaced 180 degrees apart and three sets of two planetary gears each spaced 120 degrees from one another in FIG. 8D.

First discussing the operation of FIG. 8A, embodiment 800, let us assume that the shaft 801 rotates clockwise (CW) and the carrier assembly 817, 818, 817A and 818A is control and held. Then, the planetary gears 805, 805A will rotate counter-clockwise (CCW). Planetary gears 806, 806A meshed with gears 805, 805A will rotate clockwise (CW). Planetary gear 806, 806A meshed with second output sleeve 808 will rotate counter-clockwise (CCW). On the other hand, if the control carriers 817, 818, 817A and 818A are free to rotate (not fixed), then output sleeve 808 will be free wheeling.

Now the operation of FIG. 8B, embodiment 850, the sleeve embodiment, will be discussed. Carrier shaft 810 and carrier assembly may be assumed to turn clockwise (CW). With assignment of a control variable to first sleeve and sun gear 812, holding the sleeve 812 will cause first planetary gear 815 to rotate in the same direction of rotation CW as the shaft 810 as the carrier brackets 809, 811 rotates with the shaft 810. The second planetary gears 816, 816A are meshed with planetary gears 815, 815A (see FIG. 8B) and so will rotate in the opposite direction counter-clockwise (CCW). The second planetary gears 816, 816A in turn are meshed with the assigned output variable which is second sleeve and sun gear 814 and so this output rotates in the same direction, CW, as the input variable. When the first sleeve control 812 is not held, the output is free wheeling. This result is important for a discussion of a 4V spur gear Transgear gear assembly as will be discussed with reference to FIG. 16A where an added outer ring gear is added, for example, as a second control variable for direction control. As will be further discussed herein, spur gear assemblies may comprise different width and different diameter sets or pairs of planetary gears and so form a four variable (4V) ring gear assembly.

Transgear Gear Assembly #13, #14 and #15: The Basic Spur Gear Transgear Gear Assembly with Three Variables, Sleeve Embodiment with Different Diameter Sun Gears FIGS. 9 through 14 are intended to represent the principle of designing a variation of predetermined gear ratio, gear sizes, gear shapes and the assembly width. FIG. 9A provides a front view of a basic spur gear three variable Transgear gear assembly 900 having a shaft 901 integral with or attached to a carrier center block 905. In this embodiment the gear assembly may be three gears wide: left sun gear 912, carrier and planetary gears and right sun gear 914. A first variable may be the left sun gear 912. A second variable may be the carrier assembly 901. A third variable may be the right sun gear and sleeve 914. Note that the diameter of 914 is greater than the diameter of 912 with all planetary gears having the same diameter. There are also shown two sets (pairs) of planetary gears in assembly 950, each planetary gear offset slightly from the other due to the different diameters of 912 (smaller than) and 914. The upper pair of planetary gears may be seen in the front and side views but are not labeled. Assembly 950 shows three sets of equal diameter planetary gears offset from one another due to the different diameters of sleeves 912 and 914. Any of the three principal components may be assigned to be input, output and control or may be assigned to accumulate two inputs to an output as will be taught in FIGS. 15A, 15B and 15C.

Transgear Gear Assembly #16, #17 and #18: The 3V Spur Gear Transgear Gear Assembly with Two or Three Sets of Planetary Gears of Different Diameters and Sleeves of Different Diameters FIG. 10A is a front view of a basic spur gear Transgear gear assembly 1000 having three variables with first and second sleeves 1002 and 1003 surrounding shaft 1001 having different diameter sun gears, the right sun gear 1003 having a larger diameter than the left sun gear 1002. When different size diameter and width planetary gears 1005, 1007, 1005A, 1007A are meshed with these different diameter sun gears 1002, 1003, one may understand that the two sets of two planetary gears in FIG. 10B assembly 1050 side view are shown such that the planetary gears of a set of two planetary gears such as planetary gears 1005, 1007; 1005A, 1007A are slightly offset from one another and the sets spaced at 180 degrees from one another. In FIG. 10C, there is shown a side view of the basic spur gear Transgear gear assembly 1075 but having three offset sets of two planetary gears each, offset due to the different diameters of the sun gears of left sleeve 1002 and right sleeve 1004. The larger sized diameters of planetary gear 1005, 1005A versus 1007, 1007A compensates for the smaller diameter of first sleeve left sun gear 1002 compared with second larger sleeve right sun gear 1003 and the relative rotational velocities of the first sleeve 1002 and second sleeve 1003 may be very close or the same.

Transgear Gear Assembly #19, #20 and #21: Further Spur Gear Transgear Gear Assembly with Single and Double Width Planetary Gears FIG. 11A is a front view of a basic 3V spur gear Transgear gear assembly 1100 having three variables to demonstrate that a shaft 1101 extending through the assembly 1100 may have an integral or attached sun gear 1102 having a larger diameter than a right sun gear of surrounding right sleeve 1103. To compensate, a double width planetary gear 1105 (a double gear) may mesh with first shaft (left) sun gear 1102 and single width planetary gear 1106 may mesh with double width planetary gear 1105 and sleeve 1103 second (right) sun gear. In embodiment 1150, there are two sets of two offset planetary gears shown spaced at 180 degrees from one another due to the two different diameters of first left sun gear 1102 and second right sun gear and sleeve 1103. The upper set comprises double planetary gear 1105 and single gear 1106 and the lower set comprises planetary gears 1105A and 1106A spaced 180 degrees from one another. In alternative embodiment 1175, there are three sets of two planetary gears (of different diameters and widths) spaced 120 degrees from one another. There may be four or more sets of such offset planetary gears in further embodiments not shown.

Transgear Gear Assembly #22, #23 and #24: Further Spur Gear Transgear Gear Assembly with Single and Double Width Planetary Gears of Different Diameters Referring to FIG. 12A, front view, there is shown a front view of a further 3V spur gear Transgear gear assembly 1200 having small diameter double gears 1205 meshed with larger diameter single gears 1206. FIG. 12A is a front view of the basic spur gear Transgear gear assembly 1200 having just two gear widths. Assembly 1200 has three variables where planetary gear 1205 is double width but smaller diameter than single width planetary gear 1206. Shaft 1201 has a larger diameter sun gear that meshes with planetary gear 1205, and planetary gear 1206 meshes with planetary gear 1205 and with smaller diameter sleeve 1203 so that the rotational speeds of shaft 1201 and sleeve 1203 may be similar depending on control. FIG. 12B is a front view of the basic spur gear Transgear assembly 1250 having two sets of two planetary gears each, for example, set 1205, 1206 as per front view FIG. 12A spaced apart by 180 degrees. In FIG. 12C, it may be seen that the three sets of two planetary gears may have the different diameters and be spaced equally at 120 degree spacing about the center shaft 1201.

If the input is connected to shaft 1201 and the input shaft 1201 rotates clockwise (CW) and the carrier is fixed, output sun gear 1203 becomes the output sleeve. In this case, input sun gear 1201 rotates CW, planetary gear 1205 rotates CCW, planetary gear 1206 rotates CW, and output sun gear 1203 rotates CCW. So fixing the carrier causes an opposite rotation from the input; (carrier is the control variable). Since input sun gear 1201 is larger in diameter than output sun gear 1203, the output sun gear 1203 may rotate faster than the input shaft 1201 and input sun gear 1201 and in the opposite direction. Freeing (the fixing of) the control, results in free wheeling output (neutral). This spur gear Transgear assembly 1200 is not functionally identical to the bevel gear Transgear or the basic Transgear assembly above, for example, because of the difference in rotational speed output between input and output resulting from the difference in diameter of the input sun gear 1201 being larger than the diameter of the output sun gear 1203 and the different diameters of the planetary gears.

Transgear Gear Assembly #25, #26 and #27: Further 3V Spur Gear Transgear Gear Assembly with Double Gears of Different Diameters and Single Gears Meshed with the Smaller Diameter of the Double Gear Referring to FIG. 13A (front view), there is shown another variation of a spur gear Transgear gear assembly 1300 and the double planetary gear 1305 comprises a left larger diameter gear than a right gear portion of the double gear 1305 having a smaller diameter. The left sun gear 1301 has a diameter greater than the diameter of the right sun gear of sleeve 1303. FIG. 13A is a front view of a basic spur gear Transgear gear assembly 1300 having three variables wherein the planetary gear 1305 is double width (referred to herein as a double gear) and has different diameters where the left side has a larger diameter than the right side of double gear planetary gear 1305 and meshes with a larger diameter left sun gear of shaft 1301. Planetary gear 1306 may have a single width (referred to herein as a single gear) compared to double planetary gear 1305 and has a similar diameter to the diameter of left side of double planetary gear 1305 and meshes with smaller diameter right sun gear of sleeve 1303. FIG. 13B is a side view of two sets of two planetary gears as per FIG. 13A, one being a double gear 1305 of different diameters and the other a single gear 1306 and represents spur gear Transgear gear assembly 1350, the two sets of gears, each including one double gear, being spaced at 180 degrees with respect to one another. FIG. 13C is a side view of three sets of two planetary gears each, each set including one double gear, the three sets spaced at 120 degrees from one another in basic spur gear Transgear assembly 1375.

Transgear Gear Assembly #28, 29 and #30: Further 3V Spur Gear Transgear Gear Assembly with Two or Three Sets of Double Gears of the Same Diameters FIGS. 14A, 14B and 14C are intended to represent the principle of designing a predetermined high gear ratio between the left and right sun gears. FIG. 14A is a front view of a basic spur gear Transgear gear assembly 1400 having three variables wherein the planetary gear 1405 is a double width double gear and has different diameters where the left side has a larger diameter than the right side of planetary gear 1405 and meshes with a different diameter left sun gear of shaft 1401. Another double width double planetary gear 1406 may have a similar left and right diameter when compared to planetary gear 1405 and so have a similar left side diameter to the diameter of left side of double planetary gear 1405 and mesh with same size diameter right sun gear of sleeve 1403 as the sun gear of shaft 1401 via an unlabeled carrier gear using the same pin as double planetary gear 1405. FIG. 14B is a side view of two sets of two double planetary gears as per FIG. 14A and represents spur gear Transgear gear assembly 1450. FIG. 14C is a side view of three sets of two double planetary gears each, spaced at 120 degrees from one another in basic spur gear Transgear gear assembly 1475.

Transgear Gear Assemblies #31, #32 and #33 Showing how a 3V Spur Gear Transgear Clear Assembly May have Variable Assignments of Variables FIG. 15A, FIG. 15B and FIG. 15C (all front views) show a further spur gear Transgear gear assembly set 1500, 1550 and 1575 in which, for example, left sleeve 1501 of assembly 1500 may be assigned a first Input #1. A second surrounding sleeve 1502 and attached or integral carrier bracket may be assigned a second Input variable Input #2 and the Output variable may be right sleeve 1503 and attached or integral sun gear. FIG. 15A is a front view of a basic spur gear Transgear gear assembly 1500 having three assigned variables as above, but the Input, Control and Output variables may be assigned differently. FIG. 15B is a front view of a similar basic spur gear Transgear gear assembly 1550 but right outer sleeve 1552 and integral or attached sun gear and left sleeve and integral sun gear 1551 may be assigned as Input #1 and Input #2 and shaft 1553 (attached to the carrier assembly) may be the Output variable. In FIG. 15C, it may be seen that there are two sleeves, inner right sleeve 1576 and outer right sleeve 1577 that may be assigned as Input #1 and Input #2 and the Output may be left sleeve 1578. These figures also demonstrate that a Transgear gear assembly may be used as an accumulator of first and second inputs without a control to provide an accumulated output or one of the inputs may be assigned as a control in such a three variable Transgear gear assembly. If the output 1503 of FIG. 15A becomes the input 1551 of FIG. 15B and the output 1578 of FIG. 15C becomes the input 1552 of FIG. 15B, the output 1553 of FIG. 15B is an output which is accumulated four inputs. The combined assembly of FIGS. 15A, 15B, and 15C is an assembly of five variables, four inputs and an output. Planetary gears and shafts/pins are shown to be the similar in size (diameter and width) in each of assemblies 1500, 1550 and 1575 but variations can be made for specific applications.

Four Variable Transgear Gear Assemblies: 4V Spur Gear Transgear Gear Assembly #1, #2 and #3; an Introduction without Showing Added Ring Gear FIG. 16A, FIG. 16B and FIG. 16C provide mechanical diagrams and may be used as an introduction to a four variable spur gear Transgear gear assembly 1600. FIG. 16A is a front view of a four variable spur gear Transgear gear assembly 1600, 1650, 1675 without an added ring gear (not shown) and is mechanically equivalent to the 3V spur gear Transgear gear assembly of FIG. 8B but for the added ring gear which may be assigned the fourth variable. FIG. 16B is a left side view of a four variable spur gear Transgear gear assembly 1650 having first and second sets of planetary gears of two planetary gears each of same size and gear width spaced 180 degrees from one another (without the added ring gear). FIG. 16C is a left side view of a four variable spur gear Transgear gear assembly 1675 having first, second and third sets of planetary gears of two planetary gears each of same diameter and gear width spaced 120 degrees from one another (without the added ring gear).

The four variable Transgear gear assembly introduced in FIG. 16A, front view, and FIG. 16B, side view as a four variable spur gear Transgear gear assembly 1600 having an added ring gear (not shown). FIGS. 16A and 16B are very similar to FIG. 8B but for the addition of the ring gear which may be assigned, for example, as Control #2, for example, for direction control of a vehicle. A Control #1 may be left sleeve and sun gear 1602. With 1602 held, the output is in the same rotational direction as the input as per FIG. 8B.

A basic concept of a four variable Transgear gear assembly is that there is an opportunity for four variables which may be input, output and control, but there may, for example, be two inputs, an output and a control (for accumulation, for example) or one input and one output and two controls, for example, for direction control (as will be described). In yet another embodiment, there may be one input variable, one control variable and first and second output variables depending on the application of the four variable Transgear gear assembly. All three variable Transgear gear assembly types may be converted to four variable Transgear gear assemblies: bevel gear, miter gear, ring gear and spur gear.

Referring to FIGS. 16B and 16C, by way of example, two or three sets (pairs) of planetary gears are shown surrounding a shaft with sun gear 1601 at the center: 1607, 1611; 1608, 1612; 1609, 1614 and 1610, 1616. The three pairs of planetary gears are placed at 120 degrees with respect to one another as seen in FIG. 16C. The diameter of all planetary gears are constructed to be the same in this example. Also, the diameter of left sun gear 1602 is the same as the diameter of right sun gear 1606 in this example. The shaft 1601 with integral or attached carrier block and carrier brackets extends through the assembly 1600 such that sleeve and left sun gear 1602 surround a left side of shaft 1601 per FIG. 16A and a sleeve and right sun gear 1606 also surround shaft 1601. By way of example of assigning four variables to components, an input variable may be assigned to the shaft 1601 and carrier 1603A, B, C, D and carrier center block. The Input variable is given the same cross-hatching to include carrier assembly 1603, shafts/pins 1621, 1622. Components 1603A, 1603B, 1603C, 1622 and the planetary shafts/pins 1622, 1622A all have the same cross-hatching. A first control variable may be assigned to the left sleeve and sun gear 1602, and a second control variable is assigned to an added ring gear, not shown. The cross-hatching is shown to be the same for control variables and the output variable. An output variable may be assigned to right sun gear and sleeve 1606.

In a four variable spur gear Transgear gear assembly, a shaft 1601, carrier brackets 1603A, 1603B and shaft/pin 1622, 1622A may be the clockwise input (for example, the clockwise output of a motor) when control #1 is held. Where there is no cross-hatching, the gears are not a part of causing the output 1606 to rotate in the same clock-wise direction as the input. The alternative direction will be discussed with reference to FIGS. 17A and 17B. When the left sun gear and sleeve 1602 is held and the input shaft 1601 rotates clockwise, the planetary gear may rotate around the left sun gear in a clockwise direction (the same as the input carrier assembly 1603A, 1603C, 1622, 1603B, 1603D and 1622A). Then, the second planetary gear meshed with it will rotate counter clock-wise. The right sun gear 1606 will then rotate clockwise, the same rotational direction as the input.

When the added ring gear 1706 seen in FIGS. 17A and 17B as gear 1706 is held, the planetary gear 1711 rotates around the ring gear 1706 counter-clockwise. Then, the planetary gear 1712 meshed with it will rotate clockwise. As a result, the output sun gear and sleeve 1709 will rotate counterclockwise which is the opposite direction of rotation from the input 1701 and carrier assembly 1703A, B, C. D. As this discussion shows, the four variable Transgear gear assembly may be used as a direction control operated by the left sun gear 1702 and the added ring gear 1706 to switch output rotational directions. The four variable system operates because the second planetary gear 1712 of a set transfers its rotation to the output right sun gear 1709. This basic concept may also be used to develop a four variable bevel gear Transgear gear assembly discussed in detail after a further discussion of the four variable spur gear Transgear gear assembly with reference to FIGS. 17A and 17B.

4V Spur Gear Transgear Gear Assembly #2 with Explanation of Direction Control

FIG. 17A (front view) and FIG. 17B (side view) provide an overview of how, for example, direction control may be provided in a four variable spur gear Transgear gear assembly 1700, 1750 with an added ring gear 1706. Three sets of two equal diameter planetary gears are shown at 120 degrees relation to one another in assembly 1750 of FIG. 17B, side view. FIG. 17A is a front view of a four variable spur gear Transgear gear assembly 1700 having a first control at sleeve and left sun gear 1702. Control #2 (C#2) is provided by added ring gear 1706. Control #2 (C#2) is provided to the right sun gear and sleeve 1709, the assigned output. The output thus may be sleeve 1709. Referring now to FIGS. 17A and 17B, in each figure the Input shaft 1701 rotation is assumed to be clockwise. The output is changed in direction by holding one of the controls (C#1 or C#2) in turn. Referring now to FIGS. 17A and 17B, Control #1 may be locked in which case the Input may be clockwise and then the Output may also be clockwise (the same direction). When control #2 is locked, the Input may be clockwise and the Output may be counter-clockwise (the opposite direction of rotation).

When the ring gear 1706 C#2 is locked, planetary gear 1711 rotates around ring gear 1706 and transfers the motion to gear 1712 and so output direction is counter to input rotational direction. Without gear 1712, there will be no output. The same concept will be applied to a 4V ring gear assembly or a 4V bevel gear assembly discussed later. Additional planetary gears of a spur gear assembly may be added to convert a three variable ring gear assembly to a four variable ring gear assembly. Planetary gears may be, as discussed above, of different diameters and different widths such as double gears and single gears of different diameters (or have the same width and diameters). Also the first and second sun gears or a ring gear or carrier center bracket may have different diameters as discussed above with respect to three variable and four variable gear assemblies.

FIG. 18A is a front view of a four variable bevel gear Transgear gear assembly 1800; FIG. 18B is a side view of the same four variable bevel gear Transgear gear assembly 1800 and FIG. 18C is a top view. The four variable bevel gear Transgear gear assembly 1800 is missing a right outer sleeve and sun bevel gear seen in FIGS. 18H through 18O but provides an introduction to this assembly. Direction control in a four variable bevel gear Transgear gear assembly 1800 occurs in the same manner as described above for a four variable spur gear Transgear gear assembly 1700 by holding (fixed or not moving) one of Control #1 sleeve 1802 and Control #2 sleeve 1808 for a forward or a reverse direction Output.

FIGS. 18A through 18O show in sets of three Figures each such as FIG. 18A front view, FIG. 18B side view and FIG. 18C top view, how the four variable bevel gear Transgear gear assembly may function as a direction control by holding control #1 and then holding control #2. Referring to FIGS. 18A and 18B, it may be understood that in carrier assembly 1800, shaft 1801 is attached to orthogonal shafts 1821, 1841 and to carrier center block (unlabeled). Shaft 1801 may be assigned as an Input variable and when it turns clockwise, so turn cross or central shaft 1821, 1841 and carrier center block portion thereof in the same clockwise direction. As shaft/carrier assembly 1801 turns clockwise, so must inner carrier bevel gears 1805A and 1805B rotate with outer bevel gears 1804A and 1804B if left sleeve and bevel gear 1802 are held, bevel gears 1804A and 1805A forming a double bevel gear. In general, if one of 1802 (Control #1) or another component (Control #2) not shown yet is held, then, the other of 1808 must rotate because it is meshed with turning bevel carriers 1804A and 1804B, 1805A and 1805B.

In FIG. 18D (front view), FIG. 18E (side view) and FIG. 18F (top view), the beveled gears 1806A and 1806B are added to FIGS. 18A, 18B and 18C and rotate around third orthogonal shaft 1841 seen in FIGS. 18D and 18E. Component 1806B will be considered in relation to what has been explained above with respect to the clockwise input and holding of control #1 (or control #2). Since 1806A and 1806B is meshed with carrier 1804A and 1804B, 1806A and B must rotate in the opposite direction from 1804A and 1804B. The output variable is still not shown in FIGS. 18D through 18F.

In FIG. 18G (front view), FIG. 18H (side view) and FIG. 18I (top view), the output outer sleeve 1810 is now shown in FIGS. 18H and 18I. Component 1806A, 1806B has a beveled edge and is meshing with outer sleeve and output gear 1810 as seen in FIG. 18I. The beveled gears 1806A, 1806B will be considered with respect to output variable assignment to outer beveled gear and sleeve 1810.

Now in FIG. 18J (front view), FIG. 18K (side view) and FIG. 18L (top view), it will be discussed how holding (Control #1) with a clockwise input applied to shaft 1801 impacts the turning of Output variable 1810. Central shaft 1801 turns carrier 1804A, 1804B counter-clockwise with left sleeve 1802 held and holding, inner carrier gears 1805A and 1805B rotates around gear 1802. The counter-clockwise rotation of 1804A and 1804B means that added gear 1806A and 1806B will rotate clockwise being meshed together to outer gears 1804A and 1804B. Since 1806A and 1806B drives outer sleeve 1810, the outer sleeve 1810 will provide a counter-clockwise output. As previously seen in 4V spur gear Transgears, bevel gear 1804A and 1804B are equivalent to planetary gears 1607 and 1607A, and gears 1806A and 1806B are equivalent to planetary gears 1608 and 1608A. Without gears 1806A and 1806B, there will be no output.

On the other hand, with reference to FIGS. 18M, 18N and 18O, it will be discussed how holding sleeve 1808 (Control #2) impacts the direction of turn of output variable 1810. The central shaft 1801 will still be rotating clockwise, but now holding 1808 will cause inner carrier bevel gears 1805A, 1805B and outer carrier gears 1804A and 1804B to rotate clockwise. Then, outer gears 1806A, 1806B rotate counter-clockwise and so output gear and sleeve 1810 must rotate clockwise which is the same direction as input 1801.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What I claim is:

1. Infinitely variable motion control apparatus including an N-variable spur gear assembly, where N is a number of assignable variables which equals or is greater than three, the N-variable spur gear assembly comprising an assignable input variable, an assignable output variable and an assignable control variable to components thereof having N variable assignments, the N-variable spur gear assembly comprising a shaft component for receiving a mechanical rotation for causing a shaft of the assembly to rotate at variable rotational velocity, the shaft extending through the N-variable spur gear assembly, the shaft component comprising the shaft and a carrier center block, a carrier bracket assembly component comprising at least one set of planetary gears and pins, the carrier bracket assembly component being one of integrally associated with the shaft and freely rotatable around the shaft, a first sun gear assembly component comprising a first sun gear attached to or integral with a first sleeve surrounding the shaft, the first sun gear assembly component having one of a same and an opposite direction of rotational velocity compared to the rotational velocity of the shaft component depending on an assignment of a component as a control variable, and a second sun gear assembly component comprising a second sun gear and a second sleeve, the second sun gear assembly component surrounding the rotating shaft, the second sun gear assembly component comprising a first of the N assignable variables, the shaft component and carrier bracket assembly component comprising a second of the N assignable variables; and the first sun gear assembly component comprising a third of the N assignable variables.

2. The spur gear assembly of claim 1 further comprising a ring gear component surrounding the at least one set of planetary gears, the carrier bracket assembly and the shaft;

the ring gear component being meshed with the at least one set of planetary gears, the ring gear component comprising a fourth of the N assignable variables, the fourth assignable variable being one of the assignable input variable, the assignable output variable, and the assignable control variable.

3. The N-variable spur gear assembly of claim 2, further comprising greater than or equal to one set of two planetary gears, wherein the two planetary gears of each set have equal width and diameter.

4. The N-variable spur gear assembly of claim 2 further comprising greater than or equal to one set of two planetary gears, wherein at least one set of two planetary gears comprises two planetary gears of unequal diameter.

5. The N-variable spur gear assembly of claim 2 further comprising greater than or equal to one set of two planetary gears, wherein at least one set of two planetary gears comprises one double width planetary gear and one single width planetary gear, each double width planetary gear comprising a left gear portion and a right gear portion.

6. The N-variable spur gear assembly of claim 2 further comprising greater than or equal to one set of two planetary gears, wherein at least one set of two planetary gears comprises a single width planetary gear and a double width planetary gear comprising a small diameter gear portion and a large diameter gear portion, wherein the single width planetary gear is meshed with the small diameter gear portion of the double width planetary gear.

7. The N-variable spur gear assembly of claim 2 further comprising greater than or equal to one set of two planetary gears, wherein each set of two planetary gears comprises a first double width planetary gear and a second double width planetary gear, each double width planetary gear comprises a small diameter gear portion and a large diameter gear portion, and the small diameter gear portion of the first double width planetary gear is meshed with the large diameter portion of the second double width planetary gear.

8. The N-variable spur gear assembly of claim 2 wherein the first sun gear and the second sun gear have equal diameters.

9. The N-variable spur gear assembly of claim 2 wherein the first sun gear and the second sun gear have unequal diameters.

10. Infinitely variable motion control apparatus including an N-variable spur gear assembly, where N is a number of assignable variables which equals or is greater than three, the N-variable spur gear assembly comprising an assignable input variable, an assignable output variable and an assignable control variable to components thereof having N variable assignments, the N-variable spur gear assembly comprising a shaft component for receiving a mechanical rotation for causing a shaft of the assembly to rotate at variable rotational velocity, the shaft extending through the N-variable spur gear assembly, the shaft component comprising the shaft and a carrier center block, a carrier bracket assembly component comprising at least one set of planetary gears and pins, the carrier bracket assembly component being one of integrally associated with the shaft and freely rotatable around the shaft, a first sun gear assembly component comprising a first sun gear attached to or integral with a first sleeve surrounding the shaft, the first sun gear assembly component having one of a same and an opposite direction of rotational velocity compared to the rotational velocity of the shaft component depending on an assignment of a component as a control variable, a second sun gear component being one of attached to or integral with the shaft, the shaft and second sun gear component comprising a first of the N assignable variables, the carrier bracket assembly component comprising a second of the N assignable variables, the first sun gear assembly component comprising a third of the N assignable variables, a ring gear component surrounding the at least one set of planetary gears, the carrier bracket assembly and the second sun gear of the shaft, the ring gear component being meshed with the at least one set of planetary gears, the ring gear component comprising a fourth of the N assignable variables, the fourth assignable variable being one of the assignable input variable, the assignable output variable, and the assignable control variable, and the N-variable spur gear assembly further comprising greater than or equal to one set of two planetary gears, wherein at least one set of two planetary gears comprises a single width planetary gear and a double width planetary gear comprising a small diameter gear portion and a large diameter gear portion, wherein the single width planetary gear is meshed with the small diameter gear portion of the double width planetary gear.

11. Infinitely variable motion control apparatus including an N-variable spur gear assembly, where N is a number of assignable variables which equals or is greater than three, the N-variable spur gear assembly comprising an assignable input variable, an assignable output variable and an assignable control variable to components thereof having N variable assignments, the infinitely variable motion control apparatus functioning as a direction control, the N-variable spur gear assembly comprising a shaft component for receiving a mechanical rotation for causing a shaft of the assembly to rotate at variable rotational velocity, the shaft extending through the N-variable spur gear assembly, a carrier bracket assembly component comprising at least one set of planetary gears and pins, the carrier bracket assembly component being one of integrally associated with the shaft and freely rotatable around the shaft, a first sun gear assembly component comprising a first sun gear attached to or integral with a first sleeve surrounding the shaft, the first sun gear assembly component having one of a same direction of rotational velocity and an opposite direction of rotational velocity compared to the rotational velocity of the shaft component, and a ring gear component surrounding the at least one set of planetary gears and the carrier bracket assembly component, an assignable input variable being assigned to a component comprising the shaft, a first assignable control variable being assigned to one of the carrier bracket assembly component and a second sleeve with an attached or integral second sun gear component, a second assignable control variable being assigned to the ring gear component, and an assignable output variable being assigned to the first sleeve and first sun gear component, the operation of one of the first assignable control variable and the second assignable control variable causing the output rotational velocity to be one of the same rotational direction and the opposite rotational direction from the input.

12. The N-variable spur gear assembly of claim 11 further comprising greater than or equal to one set of two planetary gears, wherein the two planetary gears of each set have equal width and diameter.

13. The N-variable spur gear assembly of claim 11 further comprising greater than or equal to one set of two planetary gears, wherein at least one set of two planetary gears comprises two planetary gears of unequal diameter.

14. The N-variable spur gear assembly of claim 11 further comprising greater than or equal to one set of two planetary gears, wherein at least one set of two planetary gears comprises one double width planetary gear and one single width planetary gear, each double width planetary gear comprising a left gear portion and a right gear portion.

15. The N-variable spur gear assembly of claim 11 further comprising greater than or equal to one set of two planetary gears, wherein each set of two planetary gears comprises a first double width planetary gear and a second double width planetary gear, each double width planetary gear comprises a small diameter gear portion and a large diameter gear portion, and the small diameter gear portion of the first double width planetary gear is meshed with the large diameter portion of the second double width planetary gear.

16. The N-variable spur gear assembly of claim 11 wherein the first sun gear and the second sun gear have equal diameters.

17. The N-variable spur gear assembly of claim 11 wherein the first sun gear and the second sun gear have unequal diameters.

* * * * *